US011763436B2

(12) United States Patent
Chakrabarty et al.

(10) Patent No.: US 11,763,436 B2
(45) Date of Patent: Sep. 19, 2023

(54) FACIAL RECONSTRUCTION NETWORK

(71) Applicant: ADOBE INC., San Jose, CA (US)

(72) Inventors: Saikat Chakrabarty, Noida (IN); Sunil Kumar, Uttar Pradesh (KR)

(73) Assignee: ADOBE, INC., San Jose, CA (US)

( * ) Notice: Subject to any disclaimer, the term of this patent is extended or adjusted under 35 U.S.C. 154(b) by 438 days.

(21) Appl. No.: 16/944,452

(22) Filed: Jul. 31, 2020

(65) Prior Publication Data

US 2022/0036534 A1   Feb. 3, 2022

(51) Int. Cl.
| *G06T 7/00* | (2017.01) |
| *G06T 5/50* | (2006.01) |
| *G06N 3/084* | (2023.01) |
| *G06V 10/75* | (2022.01) |

(52) U.S. Cl.
CPC ........... *G06T 7/0002* (2013.01); *G06N 3/084* (2013.01); *G06T 5/50* (2013.01); *G06V 10/751* (2022.01); *G06T 2207/20081* (2013.01); *G06T 2207/20084* (2013.01); *G06T 2207/20104* (2013.01); *G06T 2207/20212* (2013.01)

(58) Field of Classification Search
CPC ...................... G06T 7/0002; G06T 5/50; G06T 2207/20081; G06T 2207/20084; G06T 2207/20104; G06T 2207/20212; G06T 2207/30201; G06T 5/005; G06N 3/084; G06N 3/045; G06N 3/047; G06V 10/751; G06V 10/77; G06V 40/161; G06V 10/82
See application file for complete search history.

(56) References Cited

U.S. PATENT DOCUMENTS

| 10,410,400 | B1* | 9/2019 | Aksit | G06F 3/04845 |
|---|---|---|---|---|
| 10,586,308 | B2* | 3/2020 | Karki | G06V 10/30 |
| 11,115,645 | B2* | 9/2021 | Yang | G06V 10/82 |
| 2015/0363634 | A1* | 12/2015 | Yin | G06V 40/171 |
| | | | | 382/118 |
| 2018/0165798 | A1* | 6/2018 | Lin | G06T 5/005 |
| 2019/0096125 | A1* | 3/2019 | Schulter | G06T 7/50 |
| 2019/0114748 | A1* | 4/2019 | Lin | G06N 3/08 |
| 2019/0114818 | A1* | 4/2019 | Lin | G06T 5/005 |
| 2019/0228508 | A1* | 7/2019 | Price | G06T 7/337 |
| 2019/0279344 | A1* | 9/2019 | Duggal | G06F 3/02 |

(Continued)

OTHER PUBLICATIONS

Abdal, et al., "Image2SytleGAN: How to Embed Images Into the StyleGAN Latent Space?", arXiv:1904.03189v2 [cs.CV] Sep. 3, 2019, 23 pages.

(Continued)

*Primary Examiner* — Xuemei G Chen
(74) *Attorney, Agent, or Firm* — F. CHAU & ASSOCIATES, LLC

(57) ABSTRACT

Systems and methods for digital image processing are described. Embodiments of the systems and methods includes identifying a digital image that includes an obscured region; generating a predicted image using a neural network comprising an encoder, a feature transfer network, and a decoder, wherein the feature transfer network is trained to predict features corresponding to the obscured region based on an output of the decoder; and combining the digital image and the predicted image to produce a reconstructed version of the digital image including details corresponding to the obscured region that are not present in the digital image.

18 Claims, 14 Drawing Sheets

(56) References Cited

U.S. PATENT DOCUMENTS

| | | | | |
|---|---|---|---|---|
| 2019/0280869 A1* | 9/2019 | Streit | .................... | H04L 9/3231 |
| 2019/0295227 A1* | 9/2019 | Wang | .................... | G06V 10/82 |
| 2019/0295228 A1* | 9/2019 | Liu | ........................ | G06N 20/10 |
| 2019/0355102 A1* | 11/2019 | Lin | ........................ | G06F 18/213 |
| 2019/0392596 A1* | 12/2019 | Yang | ...................... | G06T 5/005 |
| 2020/0034709 A1* | 1/2020 | Rippel | .................. | G06V 20/46 |
| 2020/0097701 A1* | 3/2020 | Chukka | ................ | G06F 18/214 |
| 2020/0118253 A1* | 4/2020 | Eisenmann | ............. | G06T 15/10 |
| 2020/0143137 A1* | 5/2020 | Gottemukkula | ......... | G06N 3/04 |
| 2020/0234068 A1* | 7/2020 | Zhang | ................. | G06V 40/165 |
| 2020/0294309 A1* | 9/2020 | Kong | .................... | G06N 3/047 |
| 2020/0372308 A1* | 11/2020 | Anirudh | ................ | G06N 3/088 |
| 2021/0059612 A1* | 3/2021 | Krebs | .................. | A61B 5/7267 |
| 2021/0133936 A1* | 5/2021 | Chandra | ................ | G06V 10/82 |
| 2022/0180490 A1* | 6/2022 | Jo | ............................ | G06N 3/08 |
| 2022/0249031 A1* | 8/2022 | Clifton | ................. | A61B 5/7246 |
| 2023/0071559 A1* | 3/2023 | Wang | ........................ | G06T 7/55 |

OTHER PUBLICATIONS

Karras, et al., "A Style-Based Generator Architecture for Generative Adversarial Networks", arXiv:1812.04948v3 [cs.NE] Mar. 29, 2019, 12 pages.

Mao, et al., "TunaGAN: Interpretable GAN for Smart Editing", arXiv:1908.06163v1 [cs.CV] Aug. 16, 2019, 8 pages.

* cited by examiner

FACIAL RECONSTRUCTION NETWORK

BACKGROUND

The following relates generally to digital image processing, and more specifically to reconstructing facial features.

Digital image processing refers to the use of a computer to edit a digital image using an algorithm or processing network. In some cases, an image is processed using image editing software. One common use for image editing software is to edit images of people, such as photographs of people taken using a mobile electronic device. With the wide availability of cameras in smart phones and other mobile electronic devices, many people capture and edit such photographs.

However, some editing techniques are beyond the skills of an ordinary user. For example, reconstructing facial features to fill in obscured portions of a face, or to eliminate defects in an image takes significant skill and time. Therefore, there is a need in the art for improved systems and methods to automatically reconstruct portions of an image.

SUMMARY

A method, apparatus, and non-transitory computer readable medium for image processing are described. Embodiments of the method, apparatus, and non-transitory computer readable medium identify a digital image that includes an obscured region, generate a predicted image using a neural network comprising an encoder, a feature transfer network, and a decoder, wherein the feature transfer network is trained to predict features corresponding to the obscured region based on an output of the decoder, and combine the digital image and the predicted image to produce a reconstructed version of the digital image including details corresponding to the obscured region that are not present in the digital image.

A method, apparatus, and non-transitory computer readable medium for training a network for image processing are described. Embodiments of the method, apparatus, and non-transitory computer readable medium train a decoder to generate images based on input vectors, train an encoder to generate feature vectors based on input images, wherein the encoder is trained based at least in part on the trained decoder, and train a feature transfer network to generate reconstructed feature vectors based on the feature vectors, wherein the reconstructed feature vectors comprise details corresponding to obscured regions of the feature vectors, and wherein the feature transfer network is trained based at least in part on the trained encoder.

An apparatus and method for image processing are described. Embodiments of the apparatus and method include an encoder configured to generate feature vectors based on input images that include obscured regions, a feature transfer network configured to generate reconstructed feature vectors based on the feature vectors, wherein the reconstructed feature vectors include reconstructed features corresponding to the obscured regions of the input images, and a decoder configured to generate reconstructed images based on the reconstructed feature vectors, wherein the reconstructed images include details corresponding to the obscured regions of the input images based on the reconstructed features.

DETAILED DESCRIPTION

Figure 1:
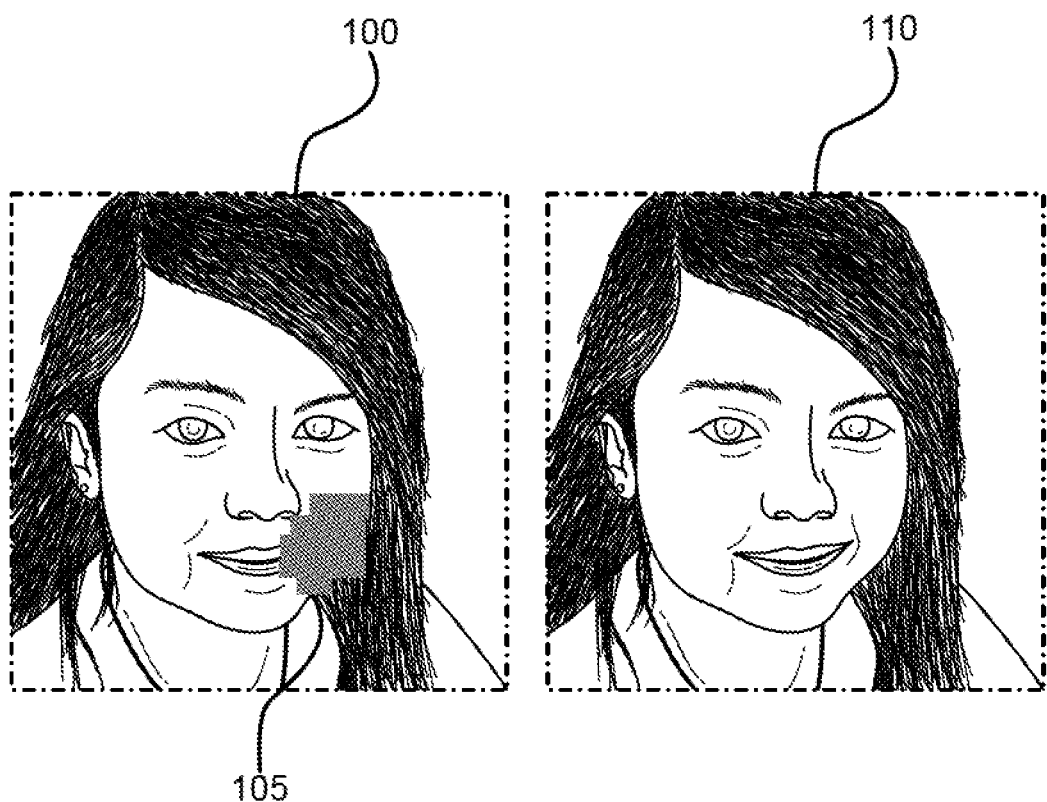
FIG. 1 shows an example of image reconstruction according to aspects of the present disclosure.

The present disclosure relates generally to digital image processing, and more specifically to reconstructing features of a digital image. Embodiments of the present disclosure include generating a predicted image using a neural network comprising an encoder, a feature transfer network, and a decoder, wherein the feature transfer network is trained to predict features corresponding to the obscured region based on an output of the decoder.

A variety of desktop software and mobile applications have been developed for editing images to correct certain defects. For example, complex image editing is achieved by a skilled user using photo editing tools such as Adobe Photoshop® (PS). However, some photo editing tools do not enable an inexperienced user to reconstruct a substantial region of an image. For example, if a user has an input image of a face with strands of hair covering an eye, or the user wants to edit out an injured region on the face, it is difficult to reconstruct those regions while maintaining a coherent and natural appearance of the input image.

That is, conventional image fill techniques do not produce satisfactory results for complex images such as facial regions, and many users do not have the requisite skills to edit facial images manually. For example, some photo editing tools include a patch and curve tool to smooth out regions of an image that include defects or blurriness. However, patch and curve tools do not work well when reconstructing a region of the facial image from scratch. For example, such tools are limited to defects that can be corrected by smoothening. They are insufficient if a complex feature such as an eye is obscured. Furthermore, the process for using such tools is tedious and time consuming.

Other photo editing tools include a context-aware fill tool. However, a context-aware fill tool also perform poorly on the facial images. For example, portions of the image become obscured instead of being refined. Deep neural networks are also used to edit facial images. However, conventional image reconstruction networks are subject to significant limitations. For example, facial features are not transferred from one portion of the face to another. Thus, if one eye is obscured or blurred, the network does not recreate the obscured region with an eye that is similar to the other eye. In addition, conventional neural networks do not fit a custom user image to the network model to ensure that a reconstruction loss is low enough to create a workable facsimile. Furthermore, human faces generated by conventional neural networks have a low resolution.

Therefore, the present disclosure provides an image generation network as an end-to-end solution to seamlessly correct common defects of the facial images. Embodiments of the present disclosure include an artificial neural network that can reliably reconstruct obscured portions of an input image (e.g., facial image) using an obscurity-invariant encoder. The obscurity-invariant encoder includes a feature transfer network that predicts features of an obscured region based on other regions of the image. Accordingly, the described systems and methods can substantially reduce information loss of the encoded facial image. In some embodiments, user-control over the quality of reconstruction (e.g., quality/time tradeoff) is also implemented.

The term "obscured region" refers to a portion of an image that has been outlined or altered (e.g., by blurring, or covering with a flat color) to indicate that the region is to be determined or processed according to techniques described herein.

The term "predicted image" refers to an output image of a neural network. According to embodiments of the present disclosure, the output image includes a reconstructed version of an obscured region of an input image.

The term "encoder" refers to a hardware or software component that takes an image as input and outputs a feature vector representing features of the image. According to some embodiments, the encoder is a neural network. In some cases, output of the encoder has a lower dimensionality than the input. In some cases, the encoder is trained to identify and encode important features of the input.

The term "feature transfer network" refers to a hardware or software component that predicts features of an obscured region of an image based on another image, or another region of the same image. According to some embodiments, the feature transfer network is a neural network. The feature transfer network may take a feature vector (i.e., the output of the encoder) as input, and may provide a reconstructed feature vector as an output.

The term "obscurity-invariant encoder" refers to a neural network that includes both an encoder (i.e., a basic encoder) and a feature transfer network. Thus, the obscurity-invariant encoder takes an image as input and outputs a reconstructed feature vector that includes predicted features of an obscured region of the image.

The term "decoder" refers to a hardware or software component that generates an image based on a feature vector. For example, the decoder may take the output of the encoder, the feature transfer network, or the obscurity-invariant encoder as an input. According to some embodiments, the decoder is a neural network.

Image Reconstruction

FIG. 1 shows an example of image reconstruction according to aspects of the present disclosure. The example shown includes obscured image 100 and reconstructed image 110. Obscured image 100 is an example of, or include aspects of, the corresponding element or elements described with reference to FIG. 5. Obscured image 100 includes obscured region 105, which refers to a region where features of an image are obscured or include defects. Reconstructed image 110 is an example of, or include aspects of, the corresponding element or elements described with reference to FIGS. 5, 12, and 13.

In some cases, the obscured region 105 is modified with an obscuring technique such as blurring, patterning, or covering with a flat color. For example, a user determines that a certain portion of an original image (i.e., corresponding to the obscured region 105) ought to be reconstructed. The user then uses a drawing tool to indicate the region, e.g., by identifying the boundary of the region. A software application then obscures the indicated portion of the image to indicate the obscured region 105, thus creating the obscured image 100.

Once the obscured image 100 is created, the image editing software applies a feature reconstruction technique based on an embodiment of the present disclosure to reconstruct the obscured region 105 and create the reconstructed image 110.

System Overview

Figure 2:
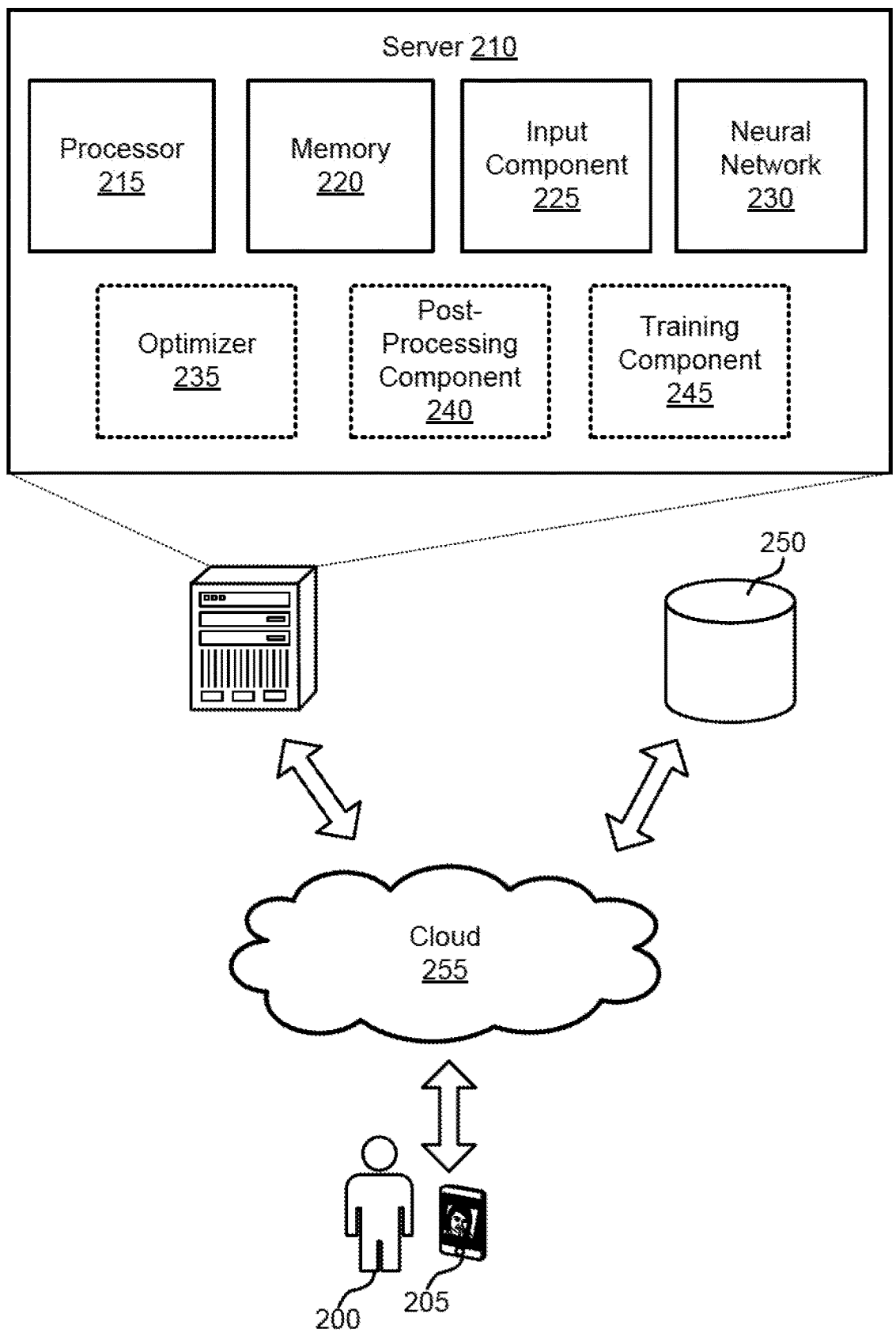
FIG. 2 shows an example of a system for image reconstruction according to aspects of the present disclosure.

FIG. 2 shows an example of a system for image reconstruction according to aspects of the present disclosure. The example shown includes user 200, user device 205, server 210, database 250, and cloud 255. According to an example use case, the user 200 identifies an image for editing on the user device 205 (e.g., a photograph including a face of a person). The user 200 obscures a portion of the image (e.g., a region of the face), and then communicates with the server 210 via cloud 255 to generate a reconstructed image including details for the obscured portion of the face. The database 250 is used to store the digital images (i.e., the original image, the reconstructed image or both).

Server 210 includes processor 215, memory 220, input component 225, neural network 230, optimizer 235, post-processing component 240, and training component 245. Although FIG. 2 illustrates an example in which the image reconstruction is performed on a server 210, the disclosure is not limited thereto. For example, in another embodiment, the functions and components of the server 210 are located at the user device 205.

Input component 225 of the server 210 identifies a digital image that includes an obscured region. Input component 225 receives the input from a user 200 that identifies a region of the digital image. In some cases, input component 225 also obscures the region based on a predetermined obscuring technique (e.g., blurring, or covering with a flat color), where the feature transfer network is trained based on a training set including images having regions obscured using the same predetermined obscuring technique.

The neural network 230 then generates a predicted image which includes reconstructed features based on other portions of the digital image. The predicted image refers to an image that includes features corresponding to an obscured region (e.g., it includes features for an obscured eye based on a visible eye). The neural network 230 includes an encoder, a feature transfer network, and a decoder, where the feature transfer network is trained to predict features corresponding to the obscured region based on an output of the decoder.

Thus, according to embodiments of the present disclosure, an artificial neural network is provided to reconstruct obscured portions of an input image (e.g., facial image). The systems and methods described later can substantially reduce information loss of the encoded facial image. In some examples, user-control over the quality of reconstruction (e.g., quality/time tradeoff) is also implemented.

In some embodiments, the encoder is tuned based on the input image. That is, the parameters of the encoder are adjusted based on comparing an output of the decoder with the original input image (either before or after a portion of the image is obscured).

In another exemplary embodiment of the present disclosure, instead of modifying the basic encoder for every user-given input image, the encoder network tunes an output latent vector of the basic encoder. In some cases, the encoder network tunes the output latent vector itself using any suitable optimizer.

Thus, in some examples, an optimizer 235 is provided that can tune an intermediate latent vector (e.g., an intermediate product of an encoder), where the final output of the encoder is based on the tuned intermediate latent vector. In some examples, the intermediate latent vector is tuned based on a mean square error (MSE) loss between a digital image and the output of an encoder. In some examples, the MSE loss is based on a grayscale mask representing pixels of the digital image (i.e., the original input image).

In one example, the optimizer 235 is an Adam optimizer (i.e., an algorithm for first-order gradient-based optimization of stochastic objective functions). In one example, the loss function for the optimizer 235 is an MSE loss between the input image and an output image from the decoder network, using a grayscale mask image (i.e., "the mask"). The mask determines which pixels of the image contribute to the MSE loss, and which do not. The mask is generated by marking the portions of the input image that the user has obscured. The tuned latent vector is fed to the feature transfer network. In an embodiment of the present disclosure, a different mask with smooth edges and of a substantially same area is used to blend the reconstructed image with the obscured input image.

Thus, in some examples, a post-processing component 240 is used to combine the digital image and the predicted image to produce a reconstructed version of the digital image including details corresponding to the obscured region that are not present in the digital image.

In some cases, the server 210 also includes a training component 245. The training component 245 trains the decoder to generate images based on input vectors. Training component 245 then trains the encoder to generate feature vectors based on input images based on the trained decoder. Training component 245 also trains the feature transfer network to generate reconstructed feature vectors based on the feature vectors, where the reconstructed feature vectors include details corresponding to obscured regions of the feature vectors, and where the feature transfer network is trained based on the trained encoder.

In some examples, the decoder is trained along with a discriminative network according to a generative adversarial network (GAN) training technique. Training component 245 compares the feature vectors and the input vectors. In some cases, training component 245 also obscures regions of the input images to create a set of obscured input images. Training component 245 compares the feature vectors to the reconstructed feature vectors. In some examples, the encoder, the feature transfer network, and the decoder are each trained independently.

A GAN is a category of ANN where two neural networks are trained based on a contest with each other. Given a training set, the network learns to generate new data with similar properties as the training set. For example, a GAN trained on photographs can generate new images that look authentic to a human observer. In some cases, GANs are used in conjunction with supervised learning, semi-supervised learning, unsupervised learning, and reinforcement learning. In some examples, a GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator network's training objective is to increase the error rate of the discriminator network (i.e., to produce novel candidates that the discriminator network classifies as real).

Figure 3:
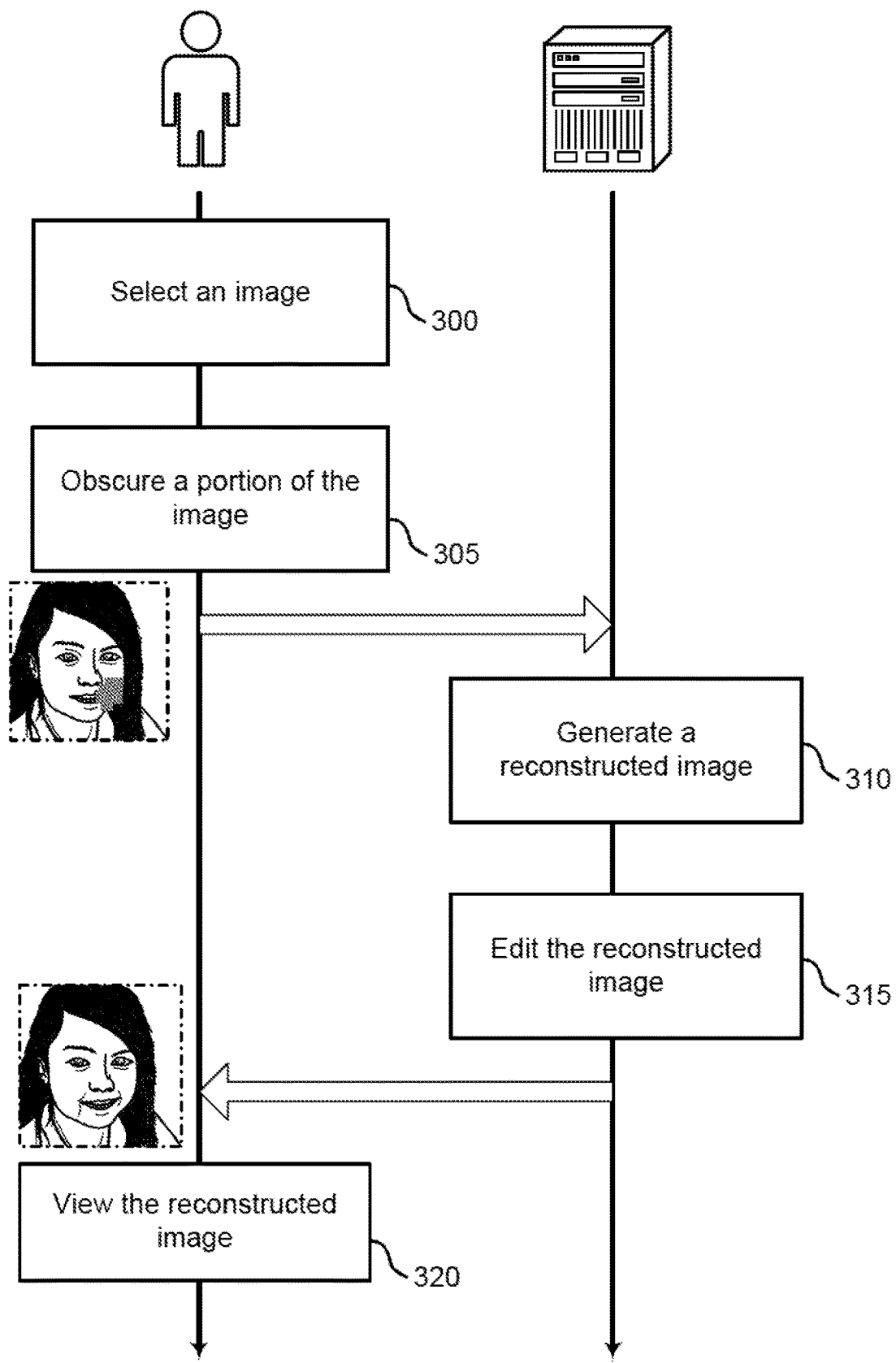
FIG. 3 shows an example of a process for image reconstruction according to aspects of the present disclosure.

FIG. 3 shows an example of a process for image reconstruction according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. For example, the operations are composed of various substeps, or are performed in conjunction with other operations described herein.

At operation 300, a user selects an image. In some cases, the operations of this step refer to, or are performed by, a user as described with reference to FIG. 2. At operation 305, the user obscures a portion of the image. In some cases, operations 300 and 305 refer to, or are performed by, a user as described with reference to FIG. 2.

Thus, according to an embodiment of the present disclosure, a user workflow includes a user selecting an input image, and painting a mask over a portion of the input image that needs to be reconstructed. For example, the user applies an elliptical mask over the portion of the input image. However, in other examples the user provides any freeform mask and is not limited to the elliptical mask. Thus, according to various examples, the user obscures the image by inserting an obscured shape over a portion of the image (i.e., a rectangle to block a portion of the image to be obscured) or by drawing a boundary of a region to be blurred.

In some cases, the user workflow also includes a user-selected quality setting. For example, the user selects a quality setting between 0 and 100. With a higher quality setting, it takes a longer time to tune the latent vector or alternatively, to tune the encoder network. For example, if the user sets the quality setting to 1, then the latent vector or the encoder network is tuned in a relatively short time. If the user sets the quality setting to 100, then the latent vector or the encoder network is tuned in a relatively long time.

The user-provided quality setting determines either a number of back-propagations used to tune the basic encoder or alternatively, to determine the parameters of an optimization performed on the latent vector input to the feature transfer layer. The number of back propagations varies from 0 to n (e.g., n is 100 iterations). This fits the encoder network to the custom input image using a perceptual loss function (e.g., VGG-based). More iterations result in a better fit (i.e., a better fit over the basic encoder). However, a large number of iterations overfit the basic encoder network, thereby affecting feature transfer operation.

At operation 310, the system for image reconstruction generates a reconstructed image. In some cases, the operations of this step refer to, or are performed by, a server as described with reference to FIG. 2. Further detail regarding the process for generating a reconstructed image is provided with reference to FIGS. 4-14 below.

At operation 315, the user edits the reconstructed image. In some cases, the operations of this step refer to, or are performed by, a user as described with reference to FIG. 2. That is, the user continues to edit the reconstructed image using various editing techniques available in the software application being used.

At operation 320, the user views the reconstructed image. In some cases, the operations of this step refer to, or are performed by, a user as described with reference to FIG. 2. That is, the user is able to view the reconstructed image on the user device 205.

Figure 4:
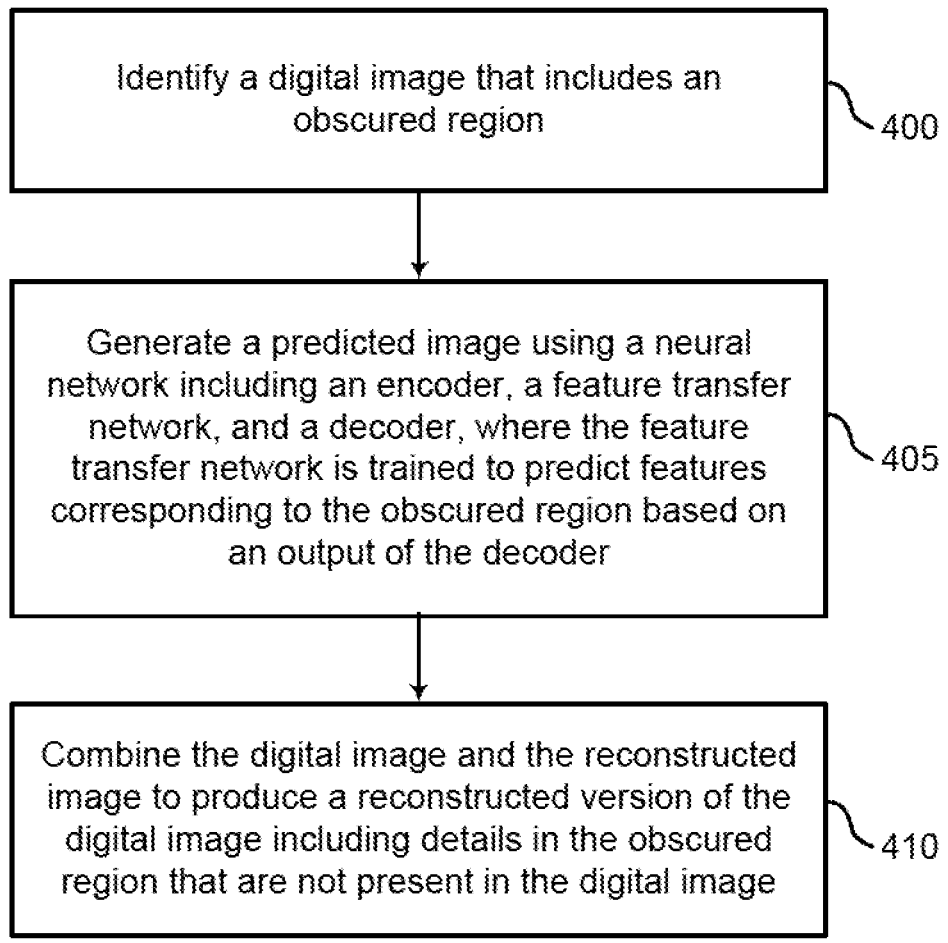
FIG. 4 shows an example of a process for image processing according to aspects of the present disclosure.

FIG. 4 shows an example of a process for image processing according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. For example, the operations are composed of various substeps, or are performed in conjunction with other operations described herein.

At operation 400, the system identifies a digital image that includes an obscured region. In some cases, the operations of this step refer to, or are performed by, an input component as described with reference to FIG. 2.

In some cases, the digital image has an obscured region identified by the user (e.g., a portion of a face). In some cases, the obscured region includes yellow teeth, a gap between two adjacent teeth, hair strand covering an eye, a black eye, an injured forehead, blemishes on forehead, etc.

A user workflow includes a user selecting a digital image, and painting a mask over a portion of the input image that needs to be reconstructed. For example, the user applies an elliptical mask over the portion of the input image. However, in other examples the user provides any freeform mask and is not limited to the elliptical mask.

At operation 405, the system generates a predicted image using a neural network including an encoder, a feature transfer network, and a decoder, where the feature transfer network is trained to predict features corresponding to the obscured region based on an output of the decoder. In some cases, the operations of this step refer to, or are performed by, a neural network as described with reference to FIG. 2.

According to an embodiment of the present disclosure, the neural network runs inference on an obscured image derived from an input image. The obscured image has an obscured region identified by the user (e.g., a portion of a face). The network includes an obscurity-invariant encoder and a decoder. The obscured image is input into the obscurity-invariant encoder. The obscurity-invariant encoder includes a basic encoder ("encoder" herein) and a feature transfer network. In some examples, the encoder is a slightly modified VGG-16.

According to an embodiment of the present disclosure, the encoder produces an image encoding. In one example, the image encoding has a dimension of 1×512. The image encoding is fed into the feature transfer network which generates a reconstructed encoding having a same dimension as the image encoding (e.g., 1×512). The reconstructed encoding is fed into a decoder. In some examples (i.e., in which the decoder is based on a StyleGAN architecture), the decoder includes a synthesis network. A reconstructed image from the decoder (e.g., from the synthesis network of a StyleGAN decoder) is substantially the same image without the obscured region.

At operation 410, the system combines the digital image and the predicted image to produce a reconstructed version of the digital image including details corresponding to the obscured region that are not present in the digital image. In some cases, the operations of this step refer to, or are performed by, a post-processing component as described with reference to FIG. 2.

According to an embodiment of the present disclosure, a post-processing pipeline system includes an input image, a facial landmarks alignment and an alpha blending. An obscured input image is derived from an input image. For example, the input image is a facial image and the obscured input image has an obscured region on the facial image. The above obscurity-invariant encoder outputs a reconstructed image including details corresponding to the obscured region that are not present in the input image. Before performing the alpha blending, a face parsing model is run on both the input image and the reconstructed image to align a plurality of facial landmarks. By aligning the facial landmarks obtained from the face parsing model (i.e., facial landmarks alignment), the reconstructed subregion is blended at proper coordinates of the blended image.

Neural Network

Figure 5:
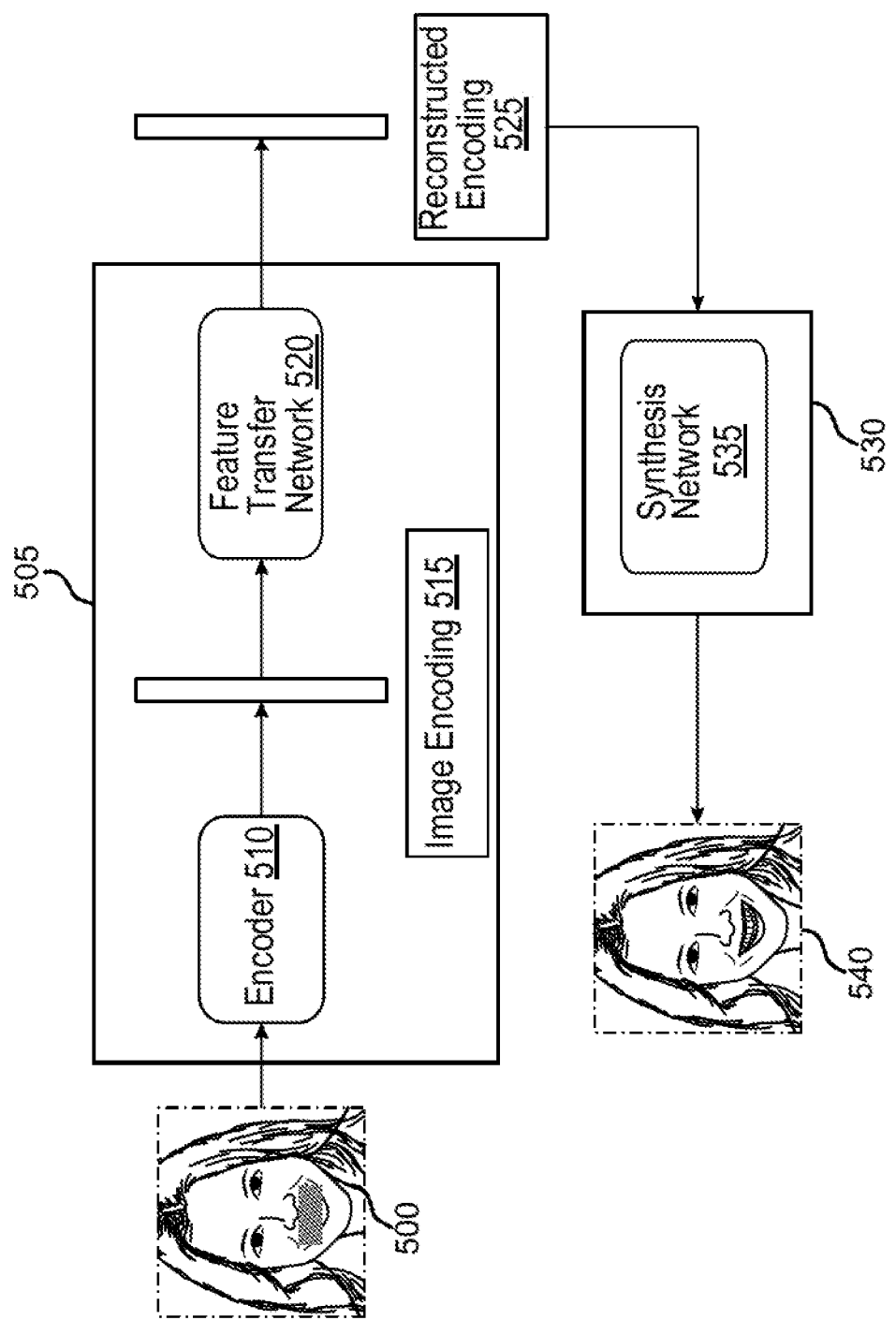
FIG. 5 shows an example of a neural network for image reconstruction according to aspects of the present disclosure.

FIG. 5 shows an example of a neural network for image reconstruction according to aspects of the present disclosure. The example shown includes obscured image 500 (i.e., the input to the neural network), obscurity-invariant encoder 505, reconstructed encoding 525, decoder 530, and reconstructed image 540.

Obscured image 500 is an example of, or include aspects of, the corresponding element or elements described with reference to FIG. 1. Obscurity-invariant encoder 505 is an example of, or include aspects of, the corresponding element or elements described with reference to FIG. 9.

Obscurity-invariant encoder 505 includes encoder 510 (i.e., a basic encoder), image encoding 515, and feature transfer network 520. The term encoder refers to a portion of a neural network that takes raw data as input (i.e., a digital image) and outputs a vector or an array of values representing features of the input. A basic encoder by itself does not include a feature transfer network. The term obscurity-invariant encoder refers to an encoder that includes both a basic encoder for encoding images and a feature transfer network for generating reconstructed features of an obscured region.

The term feature transfer network refers to a portion of the neural network that takes the output of the basic encoder and generates additional features corresponding to an obscured region. Thus, the output of the feature transfer network 520 is a vector or array of values representing both features of the original input and reconstructed features. The term decoder refers to a portion of a neural network that takes the feature vector (i.e., from the encoder) and predicts the desired output (i.e., a digital image including reconstructed features).

Thus, encoder 510 generates an image encoding 515 based on the digital image. Encoder 510 also generates an intermediate latent vector based on the digital image. During training, encoder 510 generates feature vectors based on a set of input images using. Encoder 510 also generates obscured feature vectors based on the obscured input images using the encoder 510. In some examples, the encoder 510 includes a deep convolutional neural network (CNN). Encoder 510 is an example of, or include aspects of, the corresponding element or elements described with reference to FIGS. 8, 9, and 12. Image encoding 515 is an example of, or include aspects of, the corresponding element or elements described with reference to FIG. 12.

Feature transfer network 520 generates a reconstructed encoding 525 based on the image encoding 515. The reconstructed image 540 includes the predicted features. For example, feature transfer network 520 generates the reconstructed feature vectors based on the obscured feature vectors using the feature transfer network 520. In some examples, the feature transfer network 520 includes an input layer, a hidden layer, and an output layer. In one example, the hidden layer includes twice as many nodes as the input layer. Feature transfer network 520 is an example of, or include aspects of, the corresponding element or elements described with reference to FIGS. 9 and 10.

Decoder 530 generates predicted images based on the reconstructed encoding 525. For example, decoder 530 generates images based on the input vectors using the decoder 530. Specifically, decoder 530 is configured to generate reconstructed image 540 based on the reconstructed feature vectors, where the reconstructed image 540 include details corresponding to the obscured regions of the input images based on the reconstructed features.

In some examples, the decoder 530 includes a generative adversarial network (GAN) such as a StyleGAN decoder. Thus, in some examples, the decoder 530 includes a mapping network (not shown) and a synthesis network 535. The encoder 510 is trained by comparing outputs of the mapping network to outputs of the encoder 510. Decoder 530 is an example of, or include aspects of, the corresponding element or elements described with reference to FIGS. 8 and 12. Synthesis network 535 is an example of, or include aspects of, the corresponding element or elements described with reference to FIGS. 7, 8, and 12. Reconstructed image 540 is an example of, or include aspects of, the corresponding element or elements described with reference to FIGS. 1, 12, and 13.

After the fine-tuning or optimization, the network runs inference on an obscured image 500 derived from an input image. Alternatively, the latent vector (e.g., the reconstructed encoding 525) is fine-tuned after running the encoder 510 and the feature transfer network 520. The obscured image 500 has an obscured region identified by the user (e.g., a portion of a face). The network includes an obscurity-invariant encoder 505 and a decoder 530. The obscured image 500 is input into the obscurity-invariant encoder 505. The obscurity-invariant encoder 505 includes a basic encoder 510 ("encoder" hereinafter) and a feature transfer network 520. In some examples, the encoder 510 is a slightly modified VGG-16.

The encoder 510 produces a first encoding vector (i.e., an image encoding 515). For example, the image encoding 515 has a dimension of 1×512. The image encoding 515 is fed into the feature transfer network 520 which generates a reconstructed encoding 525 having a same dimension as the image encoding 515 (e.g., 1×512). The reconstructed encoding 525 is fed into a decoder 530. The decoder 530 includes a synthesis network 535 (e.g., if the encoder is based on a StyleGAN model, it includes a mapping network and synthesis network). A reconstructed image 540 from the decoder 530 is a substantially same image without the obscured region.

Figure 6:
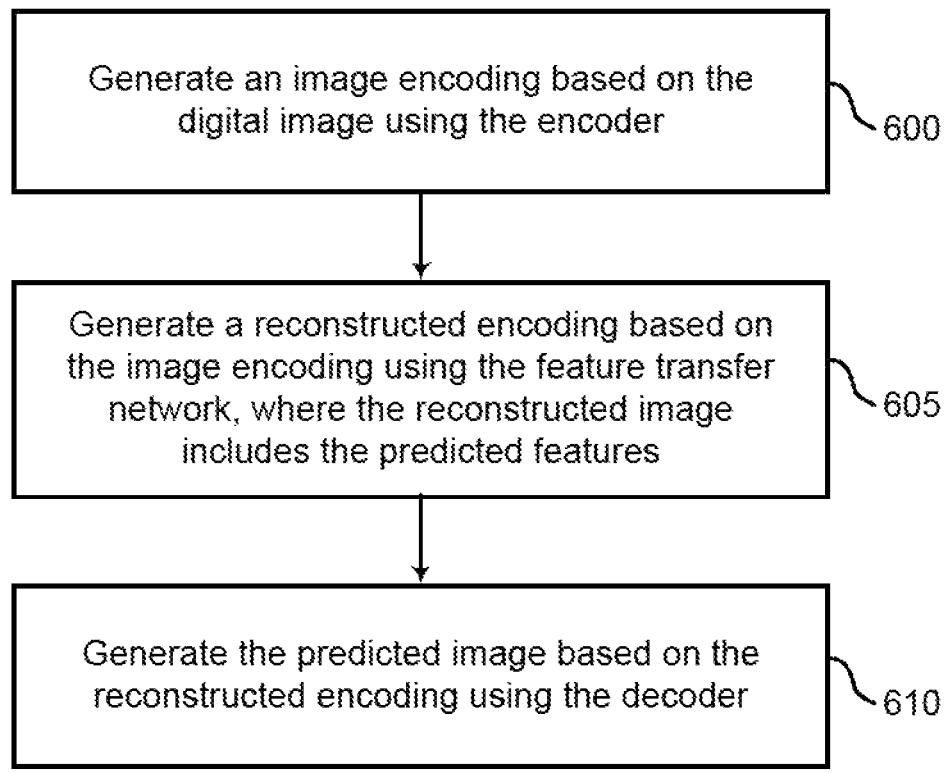
FIG. 6 shows an example of a process for generating a predicted image according to aspects of the present disclosure.

FIG. 6 shows an example of a process for generating a predicted image according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. For example, the operations are composed of various substeps, or are performed in conjunction with other operations described herein.

At operation 600, the system generates an image encoding based on the digital image using the encoder. According to an embodiment of the present disclosure, the encoder produces an image encoding. For example, the image encoding has a dimension of 1×512. In some cases, the operations of this step refer to, or are performed by, an encoder as described with reference to FIGS. 5, 8, 9, and 12.

At operation 605, the system generates a reconstructed encoding based on the image encoding using the feature transfer network, where the reconstructed image includes the predicted features. For example, the image encoding is fed into the feature transfer network which generates a reconstructed encoding having a same dimension as the image encoding (e.g., 1×512). In some cases, the operations of this step refer to, or are performed by, a feature transfer network as described with reference to FIGS. 5, 9, and 10.

At operation 610, the system generates the predicted image based on the reconstructed encoding using the decoder. For example, the reconstructed encoding is fed into a decoder. The decoder 530 includes a synthesis network 535 (e.g., according to a StyleGAN architecture as illustrated in FIG. 5). A reconstructed image 540 from the synthesis network 535 is a substantially same image without the obscured region. In some cases, the operations of this step refer to, or are performed by, a decoder as described with reference to FIGS. 5, 8, and 12.

Decoder

Figure 7:
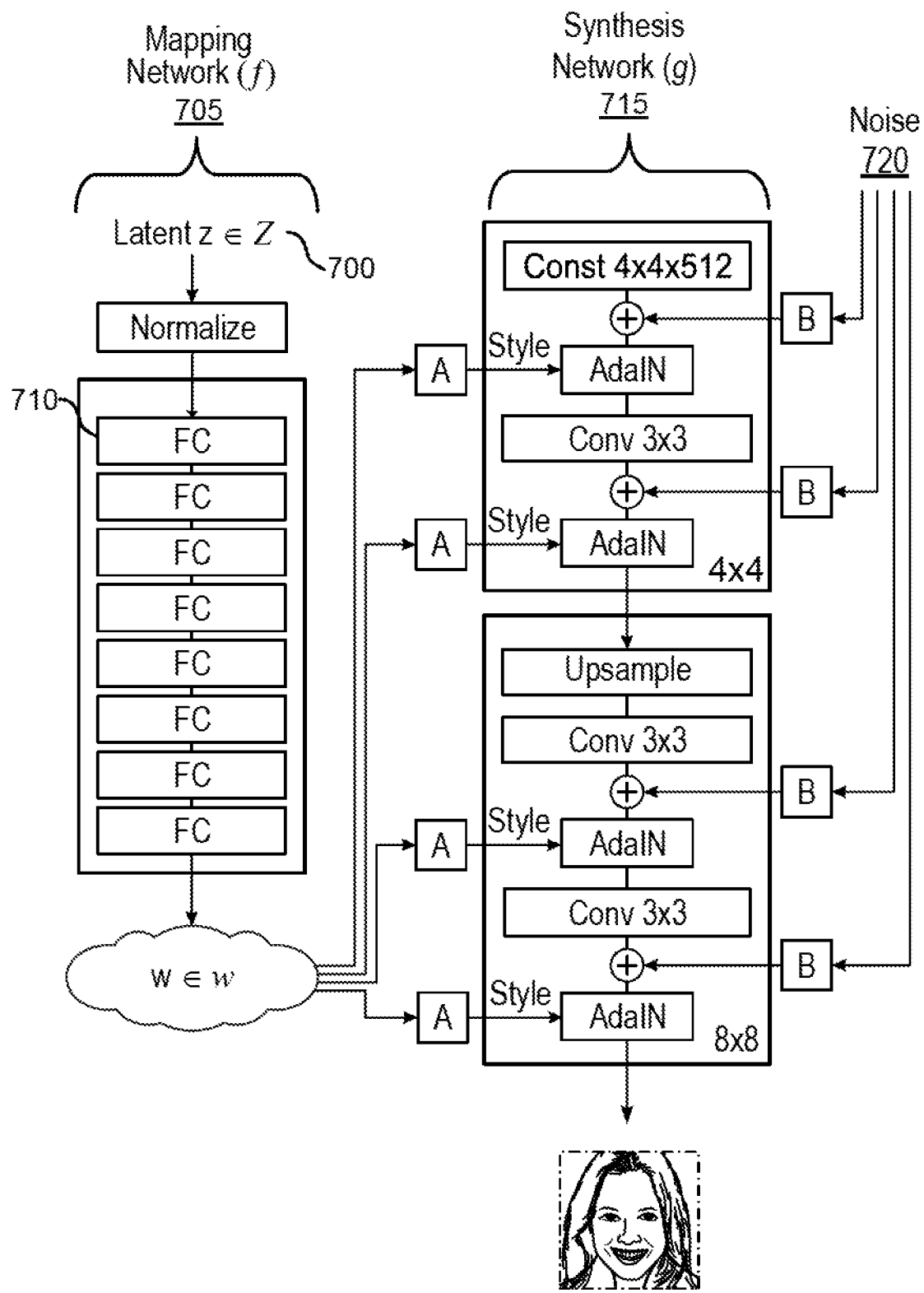
FIG. 7 shows an example of a decoder for image reconstruction according to aspects of the present disclosure.

FIG. 7 shows an example of a decoder for image reconstruction according to aspects of the present disclosure. Specifically, the example shown represents an obscurity invariant decoder having a StyleGAN architecture, and includes input vector 700, mapping network 705, fully connected layers 710, synthesis network 715, and noise 720. In some examples, the decoder is pre-trained, an encoder is trained based on the pretrained decoder.

A decoder such as a GAN (e.g., ProGAN, StyleGAN, StyleGAN2) is trained on a dataset of facial images to generate facial images from random vectors. Input vector to a decoder is a random vector and the network may generate a random facial image corresponding to that input vector. In one embodiment of the present disclosure, an input vector 700 is random latent vector. The space of initial input vectors is referred to as a Z-space.

The mapping network 705 converts the Z-space vector to an intermediate feature space referred to as a W-space. The W-space vector represent facial features. The synthesis network 715 convert the W-space vector to a generated image. For example, if the GAN is trained with facial images, the network can generate facial images. In various examples, the obscurity-invariant encoder is not contingent upon any specific GANs, and works with any suitable generative decoder.

Input vector 700 is an example of, or include aspects of, the corresponding element or elements described with reference to FIG. 8. Mapping network 705 is an example of, or include aspects of, the corresponding element or elements described with reference to FIG. 8. Synthesis network 715 is an example of, or include aspects of, the corresponding element or elements described with reference to FIGS. 5, 8, and 12.

Obscurity-Invariant Encoder

Figure 8:
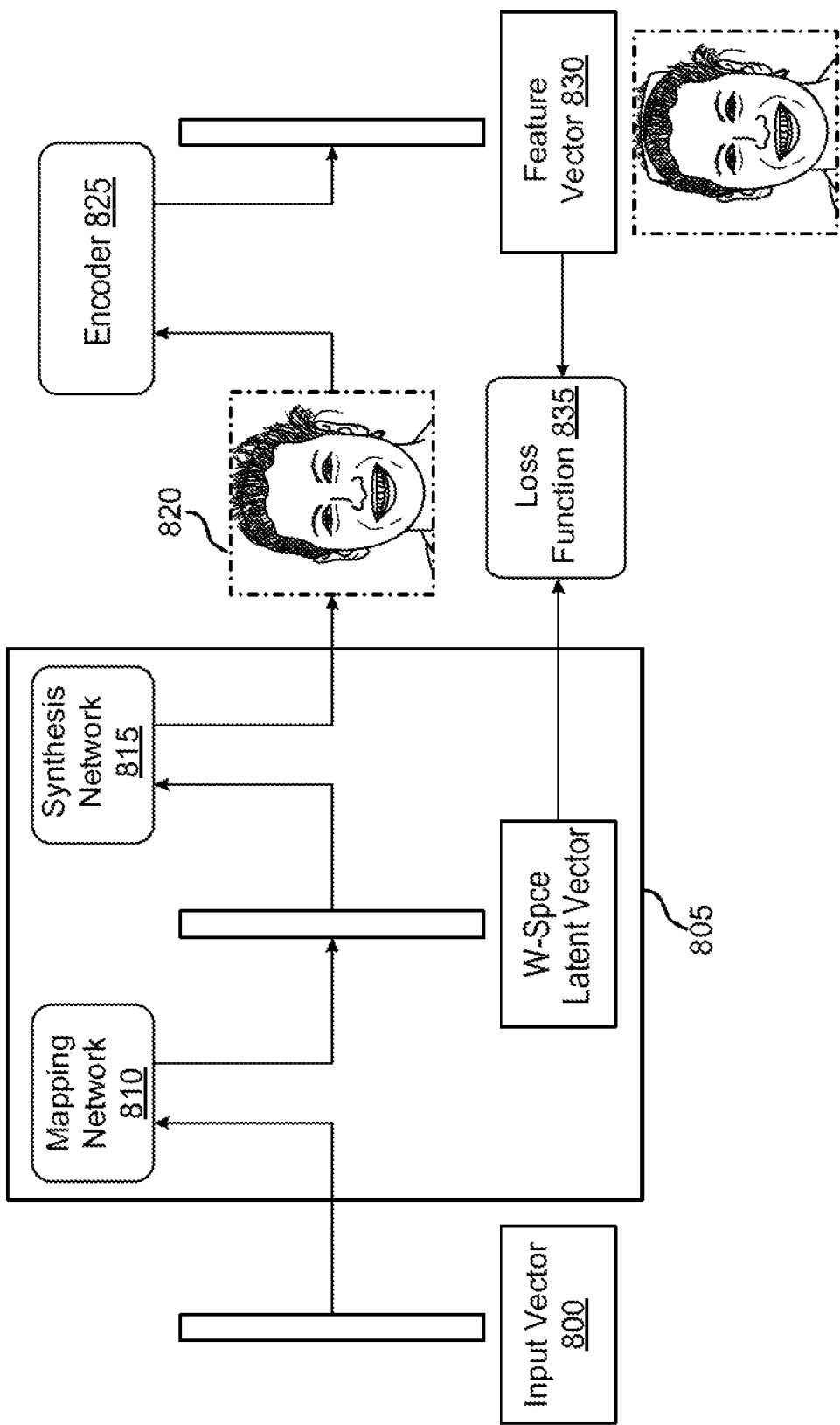
FIG. 8 shows an example of training an encoder for image reconstruction according to aspects of the present disclosure.

FIG. 8 shows an example of training an encoder 825 for image reconstruction according to aspects of the present disclosure. The encoder 825 represents a basic encoder that, when combined with a feature transfer network, forms an obscurity invariant encoder. The example shown includes input vector 800, decoder 805, generated image 820, encoder 825, feature vector 830, and loss function 835.

As an example, decoder 805 includes mapping network 810 and synthesis network 815 (i.e., if it is a StyleGAN decoder). Mapping network 810 is an example of, or include aspects of, the corresponding element or elements described with reference to FIG. 7. Synthesis network 815 is an example of, or include aspects of, the corresponding element or elements described with reference to FIGS. 5, 7, and 12.

According to an embodiment of the present disclosure, a first training phase involves training a basic encoder 825 ("an encoder" hereinafter). In some examples, the initial input vector 800 is a random vector. When the decoder 805 includes a mapping network 810 and a synthesis network 815, the input to the mapping network 810 is referred to as a Z-space, and the output of the mapping network 810 (also, the input to the synthesis network 815) is referred to as a W-space.

For example, the first training phase uses a random Z-space latent vector as an input vector 800 for the decoder 805, and the output of the decoder 805 is fed to the encoder 825. In one example, the random Z-space latent vector has a dimension of 1×512. The random Z-space latent vector is input to the decoder 805.

After running the mapping network 810, the decoder 805 generates a W-space latent vector. The W-space latent vector has a same dimension as the random Z-space latent vector, for example, 1×512. The W-space latent vector is input to the synthesis network 815 to produce a facial image. The generated image 820 is then input to the encoder 825. In some cases, the encoder 825 is a slightly modified VGG-16, but is not limited thereto. The encoder 825 produces a feature vector 830 of a same dimension as the W-space latent vector, for example, 1×512. An L1 loss is calculated between W-space latent vectors and the feature vectors 830. In an embodiment of the present disclosure, the mapping network 810 and the synthesis network 815 is not trained while the encoder 825 is trained.

Input vector 800 is an example of, or include aspects of, the corresponding element or elements described with reference to FIG. 7. Decoder 805 is an example of, or include aspects of, the corresponding element or elements described with reference to FIGS. 5 and 12. Encoder 825 is an example of, or include aspects of, the corresponding element or elements described with reference to FIGS. 5, 9, and 12. Feature vector 830 is an example of, or include aspects of, the corresponding element or elements described with reference to FIG. 9. Loss function 835 is an example of, or include aspects of, the corresponding element or elements described with reference to FIGS. 9 and 12.

Figure 9:
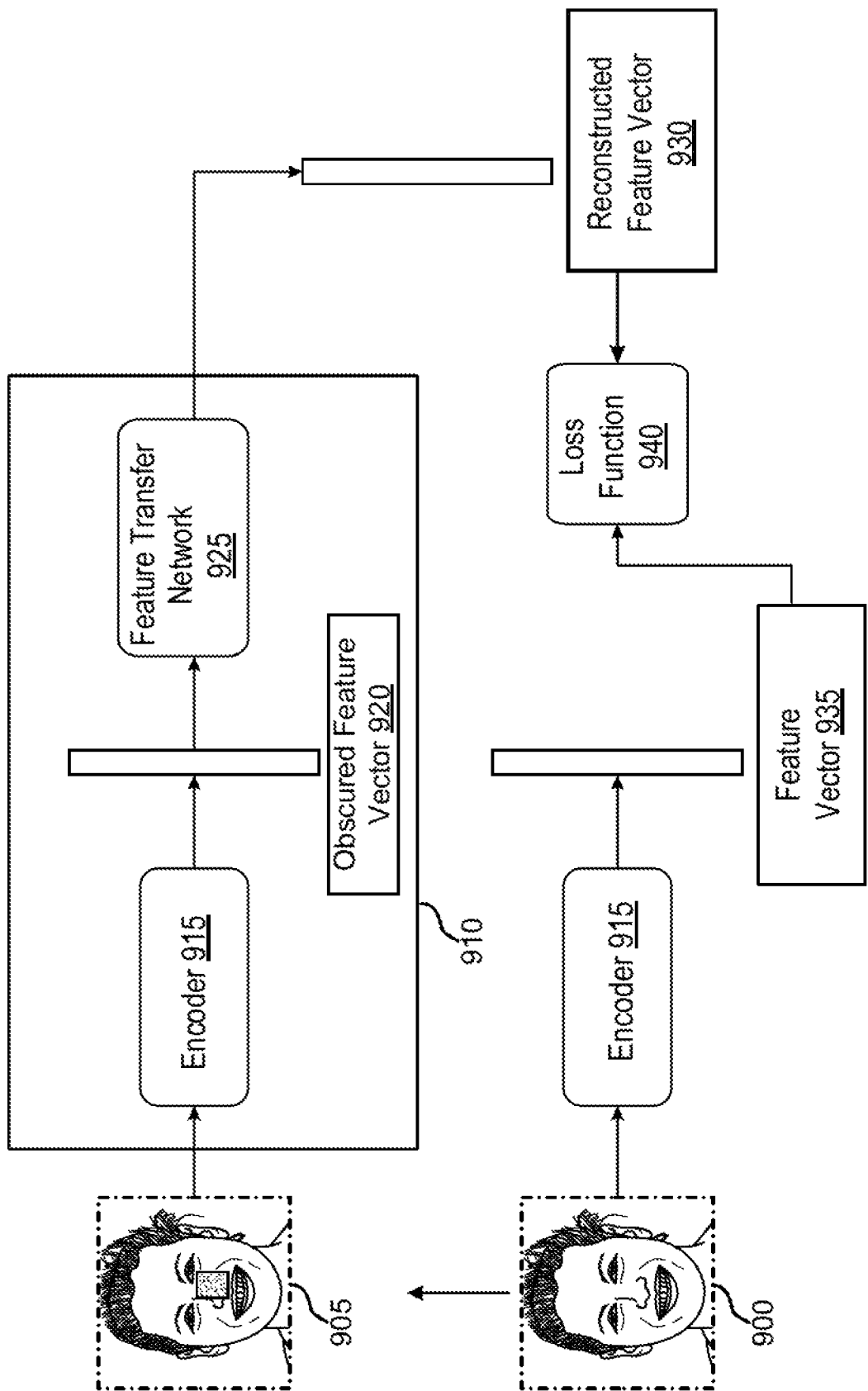
FIG. 9 shows an example of training a feature transfer network for image reconstruction according to aspects of the present disclosure.

FIG. 9 shows an example of training a feature transfer network 925 for image reconstruction according to aspects of the present disclosure. The example shown includes input image 900, obscured input image 905, obscurity-invariant encoder 910, reconstructed feature vector 930, feature vector 935, and loss function 940. Obscurity-invariant encoder 910 includes encoder 915, obscured feature vector 920, and feature transfer network 925.

According to an embodiment of the present disclosure, a second training phase (i.e., a training phase that occurs after training the basic encoder 915) is used to train a feature transfer network 925. The system includes an input image 900, an obscured input image 905, and an obscurity-invariant encoder 910 including an encoder 915 and a feature transfer network 925. The obscured input image 905 is derived from the input image 900, and includes an obscured region or regions. For example, a facial image of a woman has an obscured region around her nose. The obscured region is represented by a blurred rectangular box, but it is not limited thereto. For example, the obscured region could include any identifiable closed portion of the facial image.

The obscurity-invariant encoder 910 includes the encoder 915 trained during the first training phase as well as the feature transfer network 925. The obscured input image 905 is input into the trained encoder 915, which generates a first encoding (i.e., an obscured feature vector 920) which in one example is a vector having a dimension of 1×512. The obscured feature vector 920 is passed to the feature transfer network 925 and a reconstructed feature vector 930 is generated having a same dimension as the obscured feature vector 920 (e.g., 1×512).

In addition, the input image 900 is input to a separate basic encoder (not part of the obscurity-invariant encoder 910) and a feature vector 935 is produced having a same dimension as the obscured feature vector 920 (e.g., 1×512). An L1 loss is computed between a plurality of the reconstructed feature vectors 930 and a plurality of the feature vectors 935. In some cases, the encoder 915 is a slightly modified VGG-16 network, but it is not limited thereto. According to an embodiment of the present disclosure, the encoder 915 has been trained in a previous phase and is locked in an eval (i.e., non-trainable, inference-only) mode in the present phase.

Input image 900 is an example of, or include aspects of, the corresponding element or elements described with reference to FIGS. 12 and 13. Obscured input image 905 is an example of, or include aspects of, the corresponding element or elements described with reference to FIG. 13. Obscurity-invariant encoder 910 is an example of, or include aspects of, the corresponding element or elements described with reference to FIG. 5.

Encoder 915 is an example of, or include aspects of, the corresponding element or elements described with reference to FIGS. 5, 8, and 12. Feature transfer network 925 is an example of, or include aspects of, the corresponding element or elements described with reference to FIGS. 5 and 10. Feature vector 935 is an example of, or include aspects of, the corresponding element or elements described with reference to FIG. 8. Loss function 940 is an example of, or include aspects of, the corresponding element or elements described with reference to FIGS. 8 and 12.

Figure 10:
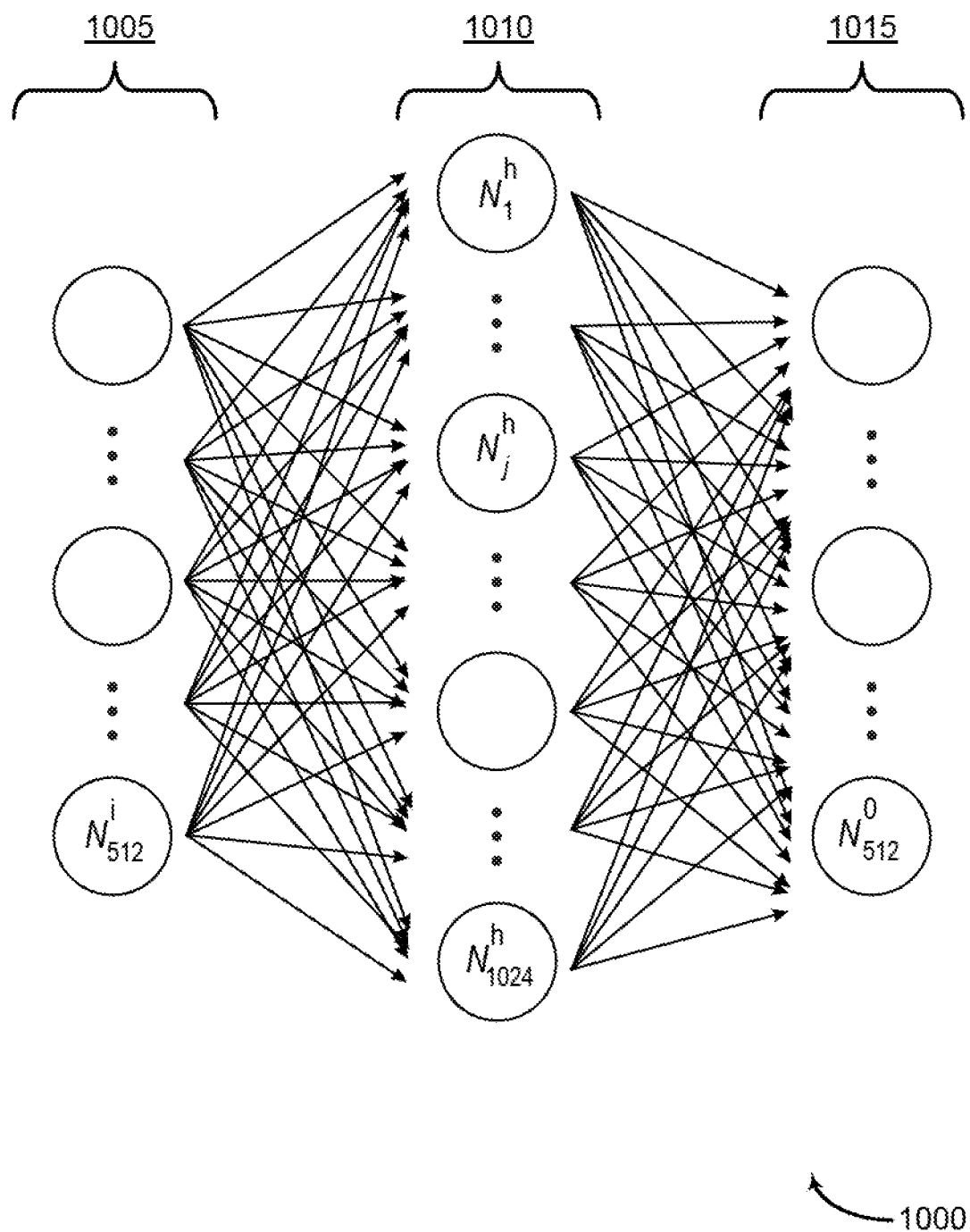
FIG. 10 shows an example of a feature transfer network according to aspects of the present disclosure.

FIG. 10 shows an example of a feature transfer network 1000 according to aspects of the present disclosure. The feature transfer network 1000 includes input layer 1005, hidden layer 1010, and output layer 1015, and is an example of, or include aspects of, the corresponding element or elements described with reference to FIGS. 5 and 9.

The feature transfer network 1000 includes a plurality of fully connected layers. For example, the feature transfer network 1000 includes an input layer 1005, a hidden layer 1010, and an output layer 1015. In some cases, the hidden layer 1010 is a single hidden layer. In an exemplary embodiment of the present disclosure, a vector of size 512 is used as the input vector, and the input vector is projected onto a 1024-dimensional space and then transformed back to a reconstructed feature vector of size 512. In some cases, the fully connected layers has no hidden layers 1010. In other cases, the fully connected layers includes one or more hidden layers 1010.

Therefore, according to embodiments of the present disclosure, the encoder network trains the basic encoder and the obscurity-invariant network (i.e., the encoder that includes the feature transfer layer) using the two phase process described herein. This results in an obscurity-invariant encoder that is robust to obscured regions in the input image.

In some examples, a smaller obscured region increases the probability of consistency with the original input image. Therefore, the obscurity-invariant network works well when a reasonable portion of the face is obscured. For example, the obscured region includes a partial eye and nose, a whole eye, a partial lip and teeth, a partial cheek, forehead, hair, etc.

Figure 11:
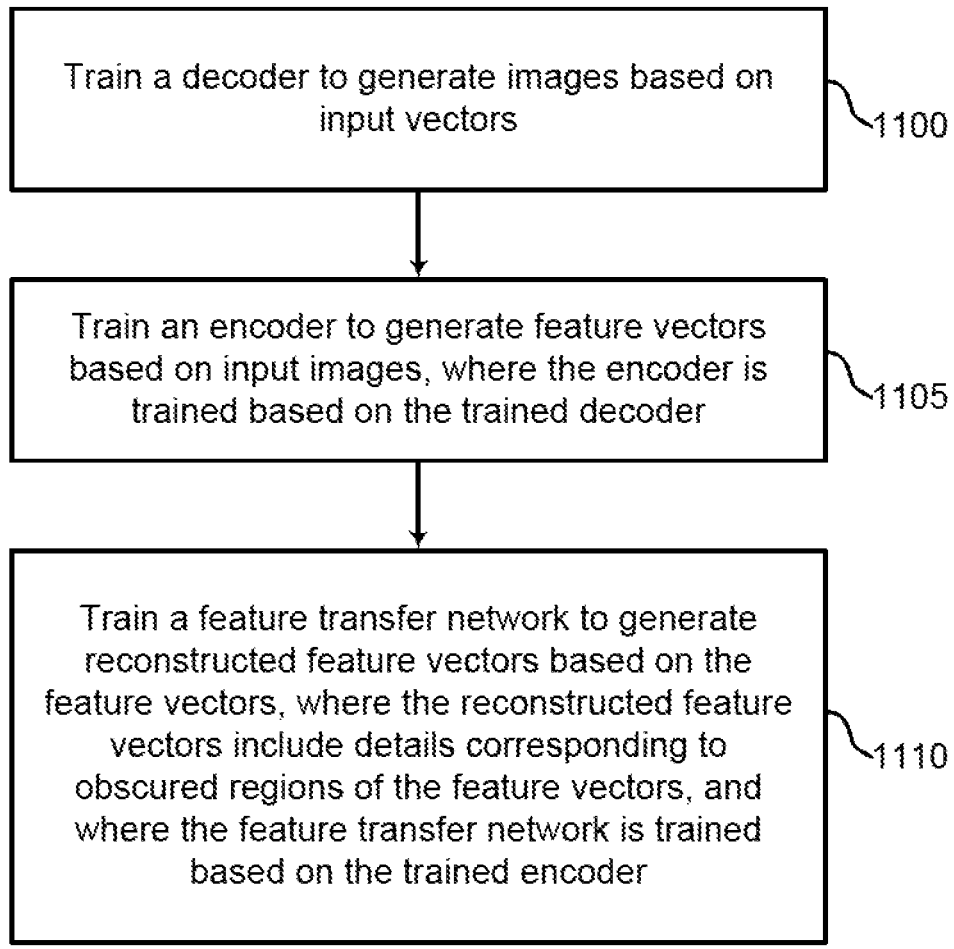
FIG. 11 shows an example of a process for training a neural network for image processing according to aspects of the present disclosure.

FIG. 11 shows an example of a process for training a neural network for image processing according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. For example, the operations are composed of various substeps, or are performed in conjunction with other operations described herein.

At operation 1100, the system trains a decoder to generate images based on input vectors. In some cases, the operations of this step refer to, or are performed by, a training component as described with reference to FIG. 2. In some cases, the decoder is pre-trained.

At operation 1105, the system trains an encoder to generate feature vectors based on input images, where the encoder is trained based on the trained decoder. In some cases, the operations of this step refer to, or are performed by, a training component as described with reference to FIG. 2. For example, the encoder is trained according to the process described above with reference to FIG. 8.

According to an exemplary embodiment of the present disclosure, an encoder is trained with any suitable target decoder. In one example, StyleGAN is used as the target decoder. In some cases, conventional StyleGAN networks include a machine learning network such as a VGG16, a VGG19, or a ResNet network to extract features from an image. The encoder network is trained using a loss function, such as a perceptual loss function, that compares the input image and a generated image.

At operation 1110, the system trains a feature transfer network to generate reconstructed feature vectors based on the feature vectors, where the reconstructed feature vectors include details corresponding to obscured regions of the feature vectors, and where the feature transfer network is trained based on the trained encoder. In some cases, the operations of this step refer to, or are performed by, a training component as described with reference to FIG. 2. For example, the feature transfer network is trained according to the process described above with reference to FIG. 9.

Thus, the obscurity-invariant encoder above differs from conventional networks by employing a feature transfer layer in addition to a basic image encoder. The feature transfer layer or layers transfers facial features from other regions to reconstruct details for the obscured regions of a face. An artificial neural network with the feature transfer layer is referred to as a feature transfer network. The feature transfer network predicts what the obscured region of the face would look like by taking into account other areas of the face. In some embodiments, the encoder is trained in two phases, including training the basic encoder to encode images (i.e., based on minimizing the L1 loss in encoding), and then fixing the basic encoder in and training the feature transfer layer.

According to an embodiment of the present disclosure, a second training phase is used to train a feature transfer network. The system includes an input image, an obscured input image, and an obscurity-invariant encoder including an encoder and a feature transfer network. The obscured input image is derived from the input image, and includes an obscured region or regions. For example, a facial image of a woman has an obscured region around her nose. The obscured region is represented by a blurred rectangular box, but it is not limited thereto. For example, the obscured region could include any identifiable closed portion of the facial image.

The obscurity-invariant encoder includes the encoder trained during the first training phase as well as the feature transfer network. The obscured input image is input into the trained encoder, which generates an obscured feature vector (e.g., a vector having a dimension of 1×512). The obscured feature vector is passed to the feature transfer network and a reconstructed feature vector is generated having a same dimension as the obscured feature vector (e.g., 1×512).

In addition, the input image is input to a separate basic encoder (not part of the obscurity-invariant encoder 910) and a feature vector is produced having a same dimension as the obscured feature vector (e.g., 1×512). An L1 loss is computed between a plurality of the reconstructed feature vectors and a plurality of the feature vectors. In some cases, the encoder is a slightly modified VGG-16 network, but it is not limited thereto.

Tuning and Post-Processing

Figure 12:
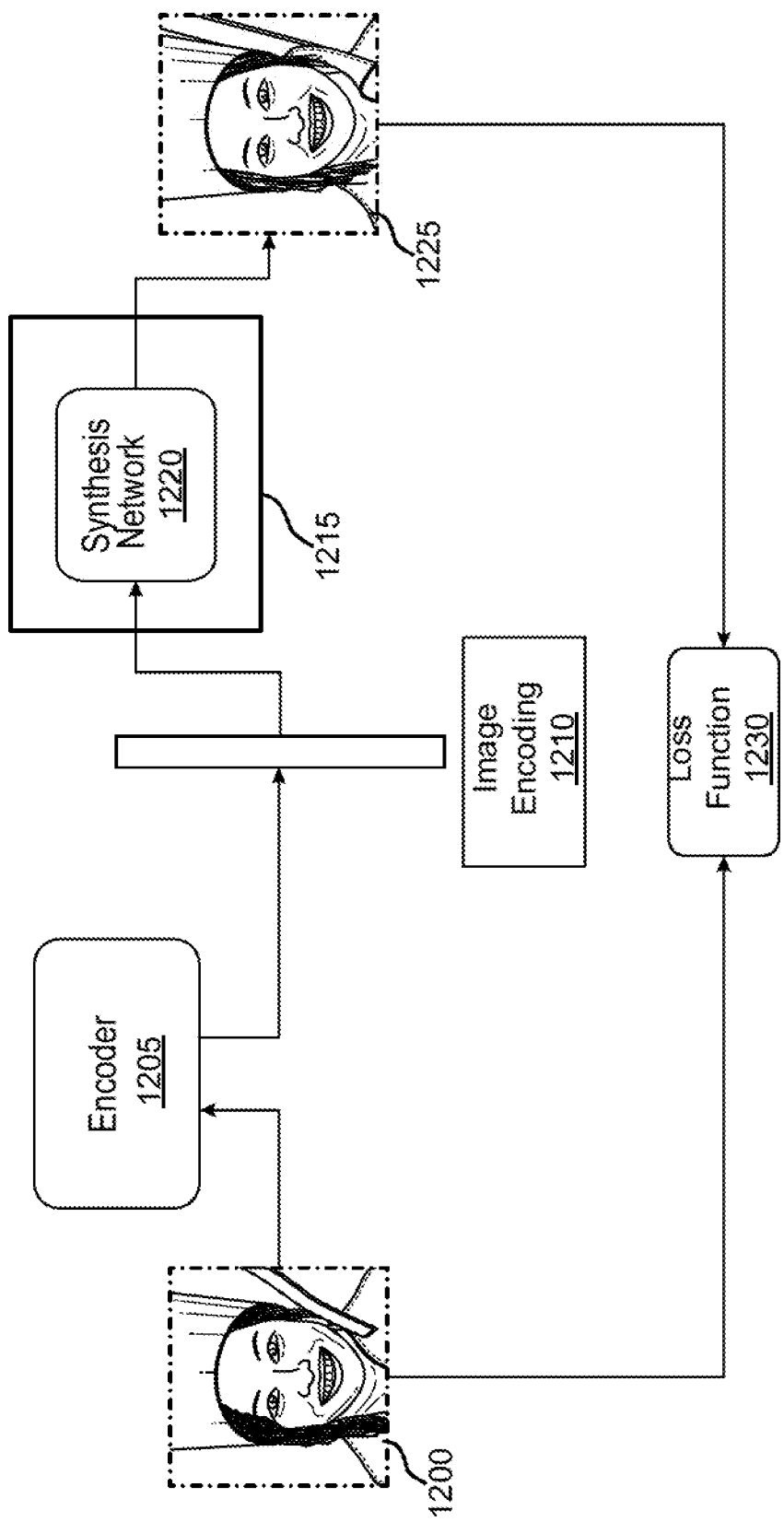
FIG. 12 shows an example of tuning an encoder according to aspects of the present disclosure.

FIG. 12 shows an example of tuning an encoder 1205 according to aspects of the present disclosure. That is, the encoder is fine-tuned at inference time to improve the result. Alternatively, an intermediate latent vector is optimized (e.g., with an Adam optimizer). The example shown includes input image 1200, encoder 1205, image encoding 1210, decoder 1215, reconstructed image 1225, and loss function 1230. Decoder 1215 includes synthesis network 1220.

According to an exemplary embodiment of the present disclosure, a network for image processing includes an encoder 1205 and a decoder 1215. An input image 1200 is fed into a basic encoder 1205 (e.g., slightly modified VGG-16) which produces a generated encoding vectors (i.e., an image encoding 1210). The input image 1200 is a facial image without any blurred regions on the image. The image encoding 1210 is a W-space latent vector having a dimension of 1×512. The image encoding 1210 is then input into the decoder 1215. The decoder 1215 includes a synthesis network 1220 (e.g., a StyleGAN decoder). The synthesis network 1220 produces a reconstructed image 1225.

A loss function 1230 (e.g., perceptual loss) is calculated between the input image 1200 and the reconstructed image 1225. For example, when number of iterations is set to 0, regions of the reconstructed image 1225 look different from the input image 1200. When number of iterations is set to 100, the reconstructed image 1225 is indistinguishable from the input image 1200 by the naked eye (except for the region that has been obscured by the user).

The quality selection may also determine learning parameters for tuning the encoder 1205. For example, a learning rate is set to 0.001 with the number of iterations set to 100.

In other examples, the encoder 1205 uses a different learning rate and the number of iterations is set differently according to a user. Thus, the pre-trained encoder 1205 is fine-tuned with respect to learning rate and number of iterations. In various examples, the fine-tuning occur before or after obtaining an obscured input image (i.e., before or after portions of an image are obscured).

Input image 1200 is an example of, or include aspects of, the corresponding element or elements described with reference to FIGS. 9 and 13. Encoder 1205 is an example of, or include aspects of, the corresponding element or elements described with reference to FIGS. 5, 8, and 9. Image encoding 1210 is an example of, or include aspects of, the corresponding element or elements described with reference to FIG. 5. Decoder 1215 is an example of, or include aspects of, the corresponding element or elements described with reference to FIGS. 5 and 8.

Synthesis network 1220 is an example of, or include aspects of, the corresponding element or elements described with reference to FIGS. 5-8. Reconstructed image 1225 is an example of, or include aspects of, the corresponding element or elements described with reference to FIGS. 1, 5, and 13. Loss function 1230 is an example of, or include aspects of, the corresponding element or elements described with reference to FIGS. 8 and 9.

Figure 13:
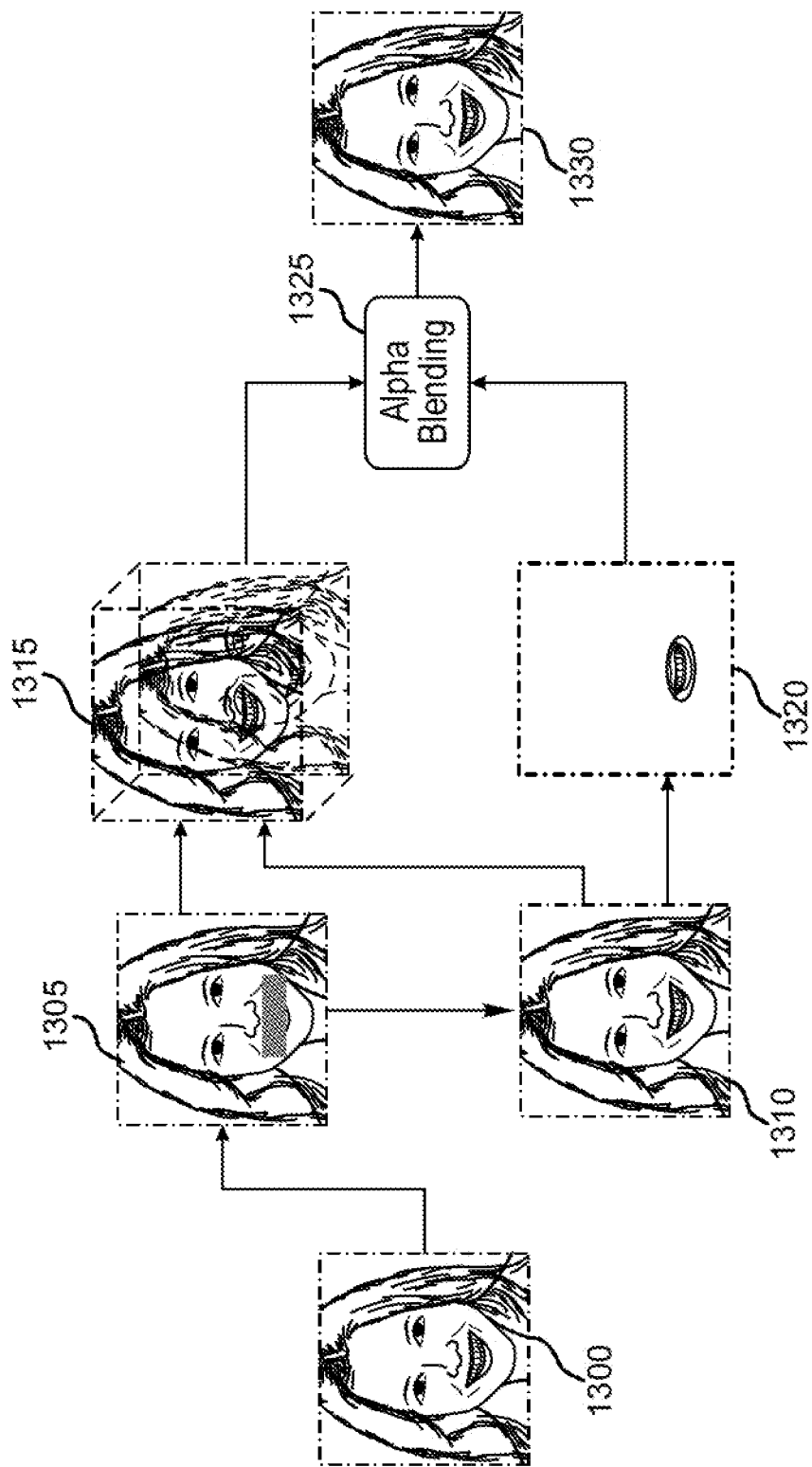
FIG. 13 shows an example of post-processing for image reconstruction according to aspects of the present disclosure.

FIG. 13 shows an example of post-processing for image reconstruction according to aspects of the present disclosure. The example shown includes input image 1300, obscured input image 1305, reconstructed image 1310, facial landmarks alignment 1315, gradient alpha mask 1320, alpha blending 1325, and blended image 1330.

According to an exemplary embodiment of the present disclosure, the output of the network is combined with the input image 1300 to produce a final output. For example, portions of the image far from the obscured region is taken directly from the input image 1300. For example, a gradient alpha mask 1320 is used to combine the original image and the reconstructed image 1310. A gradient of the gradient alpha mask 1320 helps gracefully blend a target region of a generated image to obtain a resultant image. For example, the radial gradient helps smooth out edges around the drawn mask such that no noticeable differences is observed by naked eyes. Before performing the blend operation, a face parsing model is run on both the input image 1300 and the reconstructed image 1310. By aligning a plurality of facial landmarks obtained from the face parsing model (i.e., facial landmarks alignment 1315), a subregion of the reconstructed image is blended at proper coordinates of the blended image 1330.

According to an embodiment of the present disclosure, a post-processing pipeline system includes an input image 1300, a facial landmarks alignment 1315 and an alpha blending 1325. An obscured input image 1305 is derived from an input image 1300. For example, the input image 1300 is a facial image and the obscured input image 1305 has an obscured region on the facial image. In some cases, the obscured region includes yellow teeth, a gap between two adjacent teeth, hair strand covering an eye, a black eye, an injured forehead, blemishes on forehead, etc. The above obscurity-invariant encoder outputs a reconstructed image 1310 including details corresponding to the obscured region that are not present in the input image. Before performing the alpha blending 1325, a face parsing model is run on both the input image 1300 and the reconstructed image 1310 to align a plurality of facial landmarks. By aligning the facial landmarks obtained from the face parsing model (i.e., facial landmarks alignment 1315), the subregion of the reconstructed image is blended at proper coordinates of the blended image 1330.

Input image 1300 is an example of, or include aspects of, the corresponding element or elements described with reference to FIGS. 9 and 12. Obscured input image 1305 is an example of, or include aspects of, the corresponding element or elements described with reference to FIG. 9. Reconstructed image 1310 is an example of, or include aspects of, the corresponding element or elements described with reference to FIGS. 1, 5, and 12.

Figure 14:
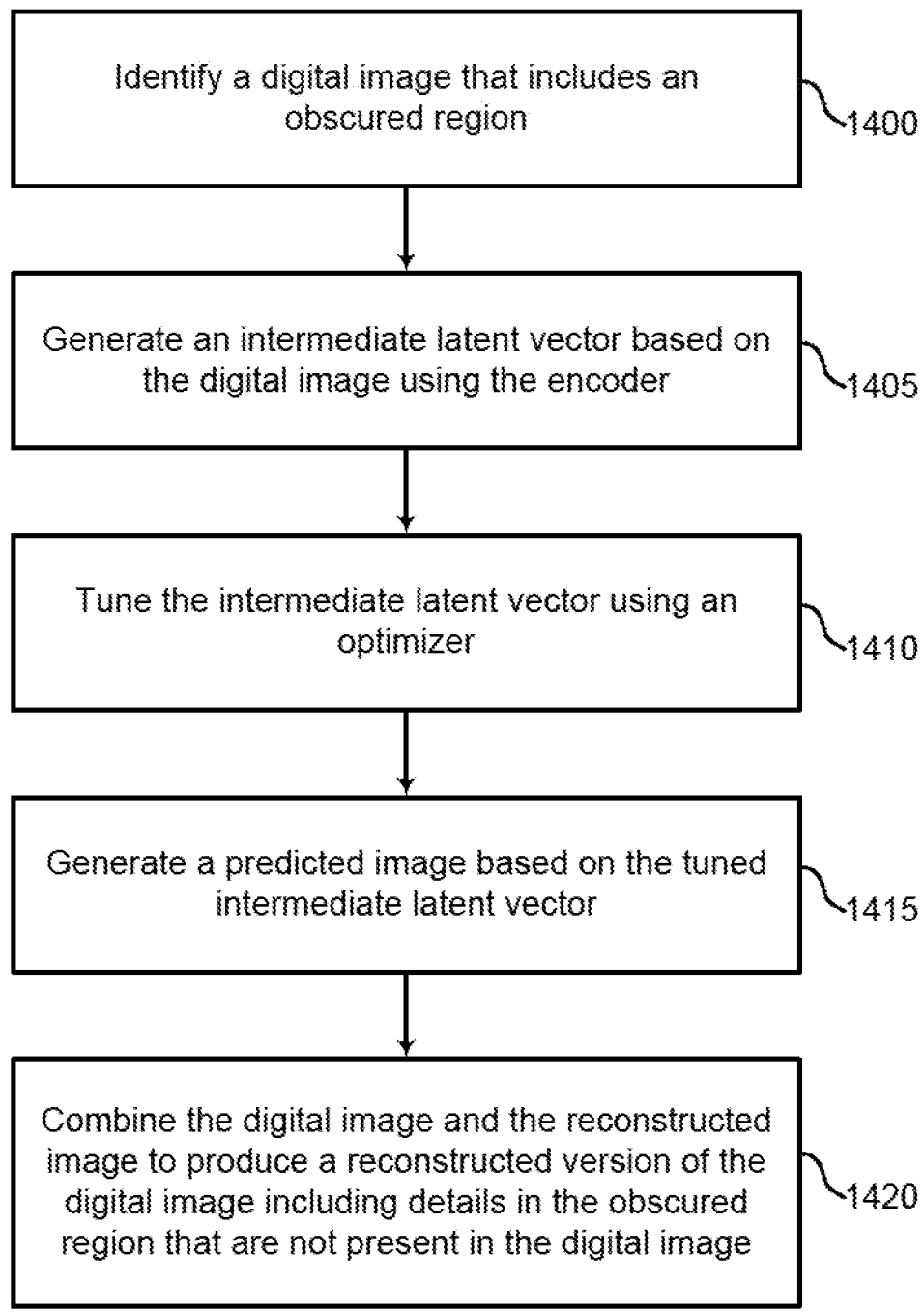
FIG. 14 shows an example of a process for image processing according to aspects of the present disclosure.

FIG. 14 shows an example of a process for image processing according to aspects of the present disclosure. In some examples, these operations are performed by a system including a processor executing a set of codes to control functional elements of an apparatus. Additionally or alternatively, the processes are performed using special-purpose hardware. Generally, these operations are performed according to the methods and processes described in accordance with aspects of the present disclosure. For example, the operations are composed of various substeps, or are performed in conjunction with other operations described herein.

At operation 1400, the system identifies a digital image that includes an obscured region. In some cases, the operations of this step refer to, or are performed by, an input component as described with reference to FIG. 2. The digital image has an obscured region identified by the user (e.g., a portion of a face). In some cases, the obscured region includes yellow teeth, a gap between two adjacent teeth, hair strand covering an eye, a black eye, an injured forehead, blemishes on forehead, etc.

At operation 1405, the system generates an intermediate latent vector based on the digital image using the encoder. In some cases, the operations of this step refer to, or are performed by, an encoder as described with reference to FIGS. 5, 8, 9, and 12.

At operation 1410, the system tunes the intermediate latent vector using an optimizer. In some cases, the operations of this step refer to, or are performed by, an optimizer as described with reference to FIG. 2.

For example, as described with reference to FIG. 2, an optimizer 235 is provided that can tune the intermediate latent vector, where an output of the encoder is based on the tuned intermediate latent vector. In one exemplary embodiment of the present disclosure, instead of modifying the basic encoder for every user-given input image, the encoder network takes an output latent vector of the basic encoder. The encoder network tunes the output latent vector itself using any suitable optimizer. For example, the optimizer includes Adam, an algorithm for first-order gradient-based optimization of stochastic objective functions.

A loss function for the optimizer is an MSE loss between the input image and an output image from the decoder network, using a grayscale mask image ("the mask" hereinafter). The mask determines which pixels of the output image contribute to the MSE loss, and which do not. The mask is generated by marking the portions of the input image that the user has obscured. The tuned latent vector is fed to the feature transfer network. In an embodiment of the present disclosure, a different mask with smooth edges and of a substantially same area is used to blend the reconstructed image with the obscured input image.

At operation 1415, the system generates a predicted image based on the tuned intermediate latent vector. In some cases, the operations of this step refer to, or are performed by, a neural network as described with reference to FIG. 2.

At operation 1420, the system combines the digital image and the predicted image to produce a reconstructed version of the digital image including details corresponding to the obscured region that are not present in the digital image. In some cases, the operations of this step refer to, or are performed by, a post-processing component as described with reference to FIG. 2.

A post-processing pipeline system includes an input image, a facial landmarks alignment and an alpha blending. An obscured input image is derived from an input image. For example, the input image is a facial image and the obscured input image has an obscured region on the facial image. An obscurity-invariant encoder outputs a reconstructed image including details corresponding to the obscured region that are not present in the input image. Before performing the alpha blending, a face parsing model is run on both the input image and the reconstructed image to align a plurality of facial landmarks. By aligning the facial landmarks obtained from the face parsing model (i.e., facial landmarks alignment), the reconstructed subregion is blended at proper coordinates of the blended image.

Accordingly, the present disclosure includes the following embodiments.

A method for image processing is described. Embodiments of the method include identifying a digital image that includes an obscured region, generating a predicted image using a neural network comprising an encoder, a feature transfer network, and a decoder, wherein the feature transfer network is trained to predict features corresponding to the obscured region based on an output of the decoder, and combining the digital image and the predicted image to produce a reconstructed version of the digital image including details corresponding to the obscured region that are not present in the digital image.

An apparatus for image processing is described. The apparatus includes a processor, memory in electronic communication with the processor, and instructions stored in the memory. The instructions are operable to cause the processor to identify a digital image that includes an obscured region, generate a predicted image using a neural network comprising an encoder, a feature transfer network, and a decoder, wherein the feature transfer network is trained to predict features corresponding to the obscured region based on an output of the decoder, and combine the digital image and the predicted image to produce a reconstructed version of the digital image including details corresponding to the obscured region that are not present in the digital image.

A non-transitory computer readable medium storing code for image processing is described. In some examples, the code comprises instructions executable by a processor to: identify a digital image that includes an obscured region, generate a predicted image using a neural network comprising an encoder, a feature transfer network, and a decoder, wherein the feature transfer network is trained to predict features corresponding to the obscured region based on an output of the decoder, and combine the digital image and the predicted image to produce a reconstructed version of the digital image including details corresponding to the obscured region that are not present in the digital image.

Some examples of the method, apparatus, and non-transitory computer readable medium described above further include receiving an input from a user identifying a region of the digital image. Some examples further include obscuring the region based on an obscuring technique, wherein the feature transfer network is trained based on a training set including images having regions obscured using the same obscuring technique.

Some examples of the method, apparatus, and non-transitory computer readable medium described above further include generating an image encoding based on the digital image using the encoder. Some examples further include generating a reconstructed encoding based on the image encoding using the feature transfer network, wherein the reconstructed image includes the predicted features. Some examples further include generating the predicted image based on the reconstructed encoding using the decoder.

In some examples, the encoder, the feature transfer network, and the decoder are each trained independently.

Some examples of the method, apparatus, and non-transitory computer readable medium described above further include generating an intermediate latent vector based on the digital image using the encoder. Some examples further include tuning the intermediate latent vector using an optimizer, wherein an output of the encoder is based on the tuned intermediate latent vector.

In some examples, the intermediate latent vector is tuned based on a mean square error (MSE) loss between the digital image and the output of the encoder. In some examples, the MSE loss is based on a grayscale mask representing pixels of the digital image.

Some examples of the method, apparatus, and non-transitory computer readable medium described above further include generating an image encoding based on the digital image using the encoder. Some examples further include generating a reconstructed image based on the image encoding using the decoder. Some examples further include tuning the encoder based on a comparison of the image encoding and the reconstructed image, wherein the encoder is tuned using a perceptual loss function that takes the image encoding and the reconstructed image as inputs.

Some examples of the method, apparatus, and non-transitory computer readable medium described above further include receiving a quality input from a user. Some examples further include updating learning parameters based on the quality input, wherein the encoder is tuned based on the learning parameters.

A method of training a network for image processing is described. Embodiments of the method include training a decoder to generate images based on input vectors, training an encoder to generate feature vectors based on input images, wherein the encoder is trained based at least in part on the trained decoder, and training a feature transfer network to generate reconstructed feature vectors based on the feature vectors, wherein the reconstructed feature vectors comprise details corresponding to obscured regions of the feature vectors, and wherein the feature transfer network is trained based at least in part on the trained encoder.

An apparatus for training a network for image processing is described. The apparatus includes a processor, memory in electronic communication with the processor, and instructions stored in the memory. The instructions is operable to cause the processor to train a decoder to generate images based on input vectors, train an encoder to generate feature vectors based on input images, wherein the encoder is trained based at least in part on the trained decoder, and train a feature transfer network to generate reconstructed feature vectors based on the feature vectors, wherein the reconstructed feature vectors comprise details corresponding to obscured regions of the feature vectors, and wherein the feature transfer network is trained based at least in part on the trained encoder.

A non-transitory computer readable medium storing code for training a network for image processing is described. In some examples, the code comprises instructions executable by a processor to: train a decoder to generate images based on input vectors, train an encoder to generate feature vectors based on input images, wherein the encoder is trained based at least in part on the trained decoder, and train a feature transfer network to generate reconstructed feature vectors based on the feature vectors, wherein the reconstructed feature vectors comprise details corresponding to obscured regions of the feature vectors, and wherein the feature transfer network is trained based at least in part on the trained encoder.

In some examples, the decoder is trained along with a discriminative network according to a generative adversarial network (GAN) framework. Some examples of the method, apparatus, and non-transitory computer readable medium described above further include generating the images based on the input vectors using the decoder. Some examples further include generating the feature vectors based on the generated images. Some examples further include comparing the feature vectors and the input vectors.

Some examples of the method, apparatus, and non-transitory computer readable medium described above further include generating the feature vectors based on a set of input images using the encoder. Some examples further include obscuring regions of the input images to create a set of obscured input images. Some examples further include generating obscured feature vectors based on the obscured input images using the encoder. Some examples further include generating the reconstructed feature vectors based on the obscured feature vectors using the feature transfer network. Some examples further include comparing the feature vectors to the reconstructed feature vectors.

Some examples of the method, apparatus, and non-transitory computer readable medium described above further include identifying an additional image comprising an obscured region. Some examples further include refining an intermediate latent vector of the encoder using an optimizer, wherein the intermediate latent vector is refined based on an MSE loss between the additional image and an output of the encoder and a grayscale image mask based on the obscured region.

An apparatus for image processing is described. Embodiments of the apparatus includes an encoder configured to generate feature vectors based on input images that include obscured regions, a feature transfer network configured to generate reconstructed feature vectors based on the feature vectors, wherein the reconstructed feature vectors include reconstructed features corresponding to the obscured regions of the input images, and a decoder configured to generate reconstructed images based on the reconstructed feature vectors, wherein the reconstructed images include details corresponding to the obscured regions of the input images based on the reconstructed features.

A method of manufacturing an apparatus for image processing is described. The method includes providing an encoder configured to generate feature vectors based on input images that include obscured regions, providing a feature transfer network configured to generate reconstructed feature vectors based on the feature vectors, wherein the reconstructed feature vectors include reconstructed features corresponding to the obscured regions of the input images, and providing a decoder configured to generate reconstructed images based on the reconstructed feature vectors, wherein the reconstructed images include details corresponding to the obscured regions of the input images based on the reconstructed features.

In some examples, the encoder comprises a deep convolutional neural network (CNN). In some examples, the feature transfer network comprises an input layer, a hidden layer, and an output layer, wherein the hidden layer comprises twice as many nodes as the input layer. In some examples, the decoder comprises a generative adversarial network (GAN). In some examples, the decoder comprises a mapping network and a synthesis network, and the encoder is trained by comparing outputs of the mapping network to outputs of the encoder. Some examples of the apparatus and method described above further include an optimizer configured to refine an intermediate latent vector of the encoder.

The description and drawings described herein represent example configurations and do not represent all the implementations within the scope of the claims. For example, the operations and steps are rearranged, combined, or otherwise modified. Also, structures and devices are represented in the form of block diagrams to represent the relationship between components and avoid obscuring the described concepts. Similar components or features have the same name but have different reference numbers corresponding to different figures.

Some modifications to the disclosure are readily apparent to those skilled in the art, and the principles defined herein are applied to other variations without departing from the scope of the disclosure. Thus, the disclosure is not limited to the examples and designs described herein, but is to be accorded the broadest scope consistent with the principles and novel features disclosed herein.

The described methods are implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may include a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein are implemented in hardware or software and are executed by a processor, firmware, or any combination thereof. If implemented in software executed by a processor, the functions are stored in the form of instructions or code on a computer-readable medium.

Computer-readable media includes both non-transitory computer storage media and communication media including any medium that facilitates transfer of code or data. A non-transitory storage medium is any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" is based on both condition A and condition B. In other words, the phrase "based on" shall be construed to mean "based at least in part on." Also, the words "a" or "an" indicate "at least one."

What is claimed is:

1. A method for image processing, the method comprising:
identifying a digital image that includes an obscured region;
generating, using an encoder of a neural network, an image encoding based on the digital image, wherein the image encoding is located in a feature vector latent space and represents the digital image including the obscured region;
generating, using a feature transfer network of the neural network, a reconstructed encoding based on the image encoding, wherein the reconstructed encoding is located in the feature vector latent space and represents predicted features in the obscured region; and
generating, using a decoder of the neural network, a predicted image based on the reconstructed encoding, wherein the predicted image includes the predicted features in the obscured region, wherein the decoder is trained separately from the feature transfer network.

2. The method of claim 1, further comprising:
receiving an input from a user identifying a region of the digital image; and
obscuring the region based on an obscuring technique, wherein the feature transfer network is trained based on a training set including images having regions obscured using the obscuring technique.

3. The method of claim 1, wherein:
the encoder, the feature transfer network, and the decoder are each trained independently.

4. The method of claim 1, further comprising:
generating an intermediate latent vector based on the digital image using the encoder; and
tuning the intermediate latent vector using an optimizer, wherein an output of the encoder is based on the tuned intermediate latent vector.

5. The method of claim 4, wherein:
the intermediate latent vector is tuned using the optimizer based on a mean square error (MSE) loss between the digital image and the output of the encoder.

6. The method of claim 5, wherein:
the MSE loss is based on a grayscale mask representing pixels of the digital image.

7. The method of claim 1, further comprising:
tuning the encoder based on a comparison of the image encoding and the reconstructed encoding, wherein the encoder is tuned using a perceptual loss function that takes the image encoding and the reconstructed encoding as inputs.

8. The method of claim 1, further comprising:
receiving a quality input from a user; and
updating learning parameters based on the quality input, wherein the encoder is tuned based on the learning parameters.

9. An apparatus for image processing, comprising:
an encoder configured to generate feature vectors based on input images that include obscured regions;
a feature transfer network configured to generate reconstructed feature vectors based on the feature vectors, wherein the feature vectors are located in a feature vector latent space and represent the input images, and wherein the reconstructed feature vectors include reconstructed features corresponding to the obscured regions of the input images; and
a decoder configured to generate reconstructed images based on the reconstructed feature vectors, wherein the reconstructed feature vectors are located in the feature vector latent space, and wherein the reconstructed images include details corresponding to the obscured regions of the input images based on the reconstructed features.

10. The apparatus of claim 9, wherein:
the encoder comprises a deep convolutional neural network (CNN).

11. The apparatus of claim 9, wherein:
the feature transfer network comprises an input layer, a hidden layer, and an output layer, wherein the hidden layer comprises twice as many nodes as the input layer.

12. The apparatus of claim 9, wherein:
the decoder comprises a generative adversarial network (GAN).

13. The apparatus of claim 12, wherein:
the decoder comprises a mapping network and a synthesis network, and the encoder is trained by comparing outputs of the mapping network to outputs of the encoder.

14. The apparatus of claim 9, further comprising:
an optimizer configured to refine an intermediate latent vector of the encoder.

15. A non-transitory computer readable medium storing code for image processing, the code comprising instructions executable by a processor to:
identify a digital image that includes an obscured region;
generate, using an encoder of a neural network, an image encoding based on the digital image, wherein the image encoding is located in a feature vector latent space and represents the digital image including the obscured region;
generate, using a feature transfer network of the neural network, a reconstructed encoding based on the image encoding, wherein the reconstructed encoding is located in the feature vector latent space and represents predicted features in the obscured region; and
generate, using a decoder of the neural network, a predicted image based on the reconstructed encoding, wherein the predicted image includes the predicted features in the obscured region, wherein the decoder is trained separately from the feature transfer network.

16. The non-transitory computer readable medium of claim 15, the code further comprising instructions executable by the processor to:
receive an input from a user identifying a region of the digital image; and
obscure the region based on an obscuring technique, wherein the feature transfer network is trained based on a training set including images having regions obscured using the obscuring technique.

17. The non-transitory computer readable medium of claim 15, the code further comprising instructions executable by the processor to:
generate an intermediate latent vector based on the digital image using the encoder; and tune the intermediate latent vector using an optimizer, wherein an output of the encoder is based on the tuned intermediate latent vector.

18. The non-transitory computer readable medium of claim 15, the code further comprising instructions executable by the processor to:

tune the encoder based on a comparison of the image encoding and the reconstructed encoding, wherein the encoder is tuned using a perceptual loss function that takes the image encoding and the reconstructed encoding as inputs.

\* \* \* \* \*